United States Patent
Jeong et al.

(10) Patent No.: US 8,570,633 B2
(45) Date of Patent: Oct. 29, 2013

(54) MEMS MIRROR, MIRROR SCANNER, OPTICAL SCANNING UNIT AND IMAGE FORMING APPARATUS INCLUDING THE OPTICAL SCANNING UNIT

(75) Inventors: Hee-Moon Jeong, Yongin-Si (KR); Jin-Ho Lee, Suwon-Si (KR); Jun-O Kim, Yongin-Si (KR); Jong-Chul Choi, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 317 days.

(21) Appl. No.: 12/511,688

(22) Filed: Jul. 29, 2009

(65) Prior Publication Data
US 2010/0046054 A1  Feb. 25, 2010

(30) Foreign Application Priority Data
Aug. 21, 2008 (KR) .................. 10-2008-0081858

(51) Int. Cl.
G02B 26/08 (2006.01)

(52) U.S. Cl.
USPC ..................... 359/224.1; 359/904

(58) Field of Classification Search
USPC .......... 359/198.1–199.4, 200.6–200.8, 202.1, 359/221.2, 223.1–225.1, 226.2, 290–295, 359/838, 846, 871, 872; 250/204, 559.06, 250/559.29, 230, 234; 347/255–260; 353/39, 98–99; 385/15–18, 22; 398/12, 398/19, 45
See application file for complete search history.

(56) References Cited

U.S. PATENT DOCUMENTS

| | | | |
|---|---|---|---|
| 6,897,990 B2 * | 5/2005 | Yagi et al. | 359/224.1 |
| 7,259,900 B2 | 8/2007 | Orcutt | |
| 2006/0245009 A1 | 11/2006 | Akiyama et al. | |
| 2007/0053045 A1 * | 3/2007 | Turner et al. | 359/224 |
| 2007/0146851 A1 * | 6/2007 | Nakajima | 359/206 |
| 2007/0242328 A1 | 10/2007 | Yasuda et al. | |
| 2007/0279725 A1 | 12/2007 | Kato et al. | |
| 2008/0094678 A1 | 4/2008 | Uduki | |

(Continued)

FOREIGN PATENT DOCUMENTS

| | | |
|---|---|---|
| CN | 101082702 A | 12/2007 |
| JP | 2004-21133 | 1/2004 |

(Continued)

OTHER PUBLICATIONS

Extended European Search Report dated Dec. 29, 2011 issued in corresponding European Patent Application No. 09165739.5.

(Continued)

*Primary Examiner* — Jennifer L. Doak
(74) *Attorney, Agent, or Firm* — Staas & Halsey LLP

(57) ABSTRACT

Disclosed are several embodiments of a micro-electro-mechanical systems (MEMS) mirror and a mirror scanner employing the same. An optical scanning unit employing such mirror scanner and an image forming apparatus including the optical scanning unit are also disclosed. The MEMS mirror may include a movable unit, which may in turn include a mirror portion and a magnet frame portion. The mirror portion may have mirror surfaces on the face surface(s) thereof. The magnet frame portion may include an opening into which a magnet is received. The MEMS mirror may also include a first fixing end and a second fixing end, to which the moving unit may be elastically supported by one or more elastic members that allows oscillating or pivoting movement of the moving unit.

40 Claims, 21 Drawing Sheets

(56) References Cited

U.S. PATENT DOCUMENTS

| | | | |
|---|---|---|---|
| 2008/0239445 A1* | 10/2008 | Ando | 359/224 |
| 2008/0297869 A1* | 12/2008 | Akiyama et al. | 359/199 |
| 2009/0051992 A1* | 2/2009 | Fujii et al. | 359/199 |
| 2009/0185248 A1* | 7/2009 | Torashima et al. | 359/198.1 |

FOREIGN PATENT DOCUMENTS

| | | |
|---|---|---|
| JP | 2005-91966 | 4/2005 |
| JP | 2005-181714 | 7/2005 |
| JP | 2006-126485 | 5/2006 |
| JP | 2006-126646 | 5/2006 |
| JP | 2006-292891 | 10/2006 |
| JP | 2007-171852 | 7/2007 |
| KR | 10-2007-0115680 | 8/2007 |
| WO | 2006/116711 | 11/2006 |

OTHER PUBLICATIONS

Chinese Office Action issued in corresponding Chinese Patent Application No. 200910167370.3 issued on Nov. 5, 2012.

Korean Office Action issued in corresponding Korean Office Action Application No. 10-2008-0081858 issued on Dec. 11, 2012.

Chinese Office Action issued Jul. 31, 2013 in corresponding Chinese Application No. 200910167370.3.

* cited by examiner

MEMS MIRROR, MIRROR SCANNER, OPTICAL SCANNING UNIT AND IMAGE FORMING APPARATUS INCLUDING THE OPTICAL SCANNING UNIT

CROSS-REFERENCE TO RELATED APPLICATION

This application claims the benefit of Korean Patent Application No. 10-2008-0081858, filed on Aug. 21, 2008, in the Korean Intellectual Property Office, the disclosure of which is incorporated herein in its entirety by reference.

TECHNICAL FIELD

The present disclosure relates to a micro-electro-mechanical systems (MEMS) mirror adopted as a dual-side mirror, to a mirror scanner and an optical scanning unit employing such mirror, and to an image forming apparatus employing the optical scanning unit.

BACKGROUND OF RELATED ART

Generally speaking, an optical scanning units is an optical apparatus that is used to scanning light from a light source onto an exposure object, and may typically be found in electrophotographic image forming apparatuses, such as photocopying machines, printers, and facsimiles, that reproduce images on printing media.

In operation, an electrophotographic image forming apparatus includes an optical scanning unit that irradiates the light onto and across the surface of a photosensitive drum using to form an electrostatic latent image on the drum. The electrostatic latent image is then developed using developer such as toner, and transferred and fused onto a printing medium.

A polygon mirror is typically used in an optical scanning unit of a conventional electrophotographic image forming apparatus. To realize full-color images, typically four light beams are scanned using two polygon mirrors. In order that the scanning of the light beams are synchronized with each other, the rotating speed of the spindle motors driving the two polygon mirrors needs to be synchronized with each other. In addition, when a polygon mirror is used, the surface area of the mirror needs to be sufficiently large in order to allow for the two parallel light beams to be incident on one reflective surface. The increased surface area however tends to restrict the rotating speed of the spindle mirror.

A new structure for an optical scanning unit that can substitute for, and that thus overcomes the shortcomings, such as for example, the rotating speed limitation, noise generated by the spindle motor operating at high speed and the enlarged size of the optical scanning unit, associated with, the spindle motor and the polygon mirror is thus desired.

SUMMARY OF THE DISCLOSURE

According to an aspect of the present disclosure, there is provided a micro-electro-mechanical systems (MEMS) mirror that may comprise a movable unit, which may include a mirror portion and a magnet frame portion. The mirror portion may have at least two face surfaces each including thereon one or more mirror surfaces. The magnet frame portion may be configured to support therein a magnet. The MEMS mirror may further comprise a first fixing end, a second fixing end, a first elastic member and a second elastic member. The first fixing end and the second fixing end may be spaced apart from each other, and from the movable unit. The first elastic member may elastically support the movable unit to the first fixing end. The second elastic member may elastically support the movable unit to the second fixing end.

The mirror portion may include a plurality of unit mirrors, each of which may include one or more mirror surfaces respectively on each of the at least two face surfaces of the mirror portion.

The magnet frame portion may be located between at least two adjacent ones of the plurality of unit mirrors.

The mirror portion may include a first unit mirror and a second unit mirror, each of which may include one or more mirror surfaces on each of the at least two face surfaces of the mirror portion.

The magnet frame portion may be located between the first and second unit mirrors.

The mirror portion may include a single unit mirror having a mirror surface on each of the at least two face surfaces of the mirror portion.

The magnet frame portion may be located between the mirror portion and one of the first and second elastic members.

The magnet frame portion may include a first magnet frame, which may be located between the mirror portion and the first elastic member, and a second magnet frame that may be located between the mirror portion and the second elastic member.

The MEMS mirror may further comprise a third elastic member, which may be located between the mirror portion and the first magnet frame; and a fourth elastic member that may be located between the mirror portion and the second magnet frame.

A first resonance frequency of the magnet frame portion and the first and second elastic members may be greater than a second resonance frequency of the mirror portion and the third and fourth elastic members.

The MEMS mirror may further comprise a reinforcing rib formed on at least one of the at least two face surfaces of the mirror portion.

The movable unit may be configured to pivot about a rotational axis. The reinforcing rib may extend in a direction perpendicular to the rotational axis of the movable unit.

The reinforcing rib is formed on at least one of the at least two face at a location adjacent a boundary of at least one of the one or more mirror surfaces.

The reinforcing rib may comprise at least two reinforcing ribs each disposed on respective one of the at least two face surfaces at locations adjacent boundaries of the one or more mirror surfaces. The movable unit may be configured to pivot about a rotational axis. The at least two reinforcing ribs may each extend in a direction perpendicular to the rotational axis of the movable unit.

The movable unit, the first and second fixing ends and the first and second elastic members may be formed from a double-layered wafer that include a first silicon layer and a second silicon layer.

The double-layered wafer may be a silicon-on-insulator (SOI) wafer.

The mirror portion and the first and second, elastic members may be formed of the first silicon layer. The magnet frame portion and the first and second fixing ends may be formed of the first and second silicon layers.

The MEMS mirror may further comprise a reinforcing rib formed of the second silicon layer on at least one of the at least two face surfaces of the mirror portion.

The magnet frame portion may include an opening in which to receive the magnet. The movable unit being configured to pivot about a rotational axis. The insertion depth of the magnet may be determined such that the rotational axis of the movable unit coincides with rotating center axes of the first and second elastic members.

The magnet frame portion may include a grip structure extending into the opening for supporting the magnet in place.

The first and second elastic members may be formed in zigzag shapes.

According to another aspect of the present disclosure, a mirror scanner may be provided to comprise a micro-electro-mechanical systems (MEMS) mirror and an electromagnet portion. The MEMS mirror may comprise a movable unit that may include a mirror portion and a magnet frame portion. The mirror portion may include one or more mirror surfaces. The magnet frame portion may be coupled to the mirror portion, and may support therein a permanent magnet. The MEMS mirror may also comprise a first fixing end and a second fixing end spaced apart from each other and from the movable unit; and a first elastic member and a second elastic member. The first elastic member may elastically support the movable unit to the first fixing end. The second elastic member may elastically support the movable unit to the second fixing end. The electromagnet portion may include a yoke and a coil surrounding the yoke. The yoke may have end portions thereof spaced apart from, and facing, each other. The end portions being arranged adjacent the permanent magnet to thereby provide an electromagnetic driving force to the MEMS mirror.

A magnetic pole direction of the permanent magnet may be perpendicular to the mirror surface. The end portions of the yoke may face one of magnetic poles of the permanent magnet.

The magnetic pole direction of the permanent magnet may be parallel to the one or more mirror surfaces and perpendicular to a rotational axis about which the movable unit rotates. The end portions of the yoke may face one of magnetic poles of the permanent magnet.

The mirror portion may include a first unit mirror and a second unit mirror, each of which includes one or more mirror surfaces on both of two face surfaces of the mirror portion.

The magnet frame portion may be located between the first and second unit mirrors.

The thickness of the electromagnet portion along the direction parallel to the one or more mirror surface may be less than the distance between the first and second unit mirrors.

The electromagnet portion may be disposed at a space between s first light beam reflected off the first unit mirror and a second light beam reflected off the second unit mirror.

The mirror portion may include a single unit mirror having a mirror surface on each of two face surfaces of the mirror portion.

The magnet frame portion may be located between the mirror portion and one of the first and second elastic members.

The electromagnet portion may be positioned away from the optical paths of the light beams that are incident on the mirror portion. The yoke may extend from the end portions to the coil at an incline.

The magnet frame portion may include a first magnet frame, which may be located between the mirror portion and the first elastic member, and a second magnet frame that may be located between the mirror portion and the second elastic member. The electromagnet portion may include a first electromagnet corresponding to the first magnet frame and a second electromagnet corresponding to the second magnet frame.

The mirror scanner may further comprise a third elastic member and a fourth elastic member. The third elastic member may be located between the mirror portion and the first magnet frame. The fourth elastic member may be located between the mirror portion and the second magnet frame.

A first resonance frequency of the magnet frame portion, the first elastic member and the second elastic member may be greater than a second resonance frequency of the mirror portion, third elastic member and the fourth elastic member. The electromagnet portion may drive the magnet frame portion at the second resonance frequency.

The mirror scanner may further comprise a reinforcing rib formed on at least one of surfaces of the mirror portion.

According to another aspect, an optical scanning unit may be provided to comprise a plurality of light sources and a mirror scanner. The mirror scanner may be configured to receive a plurality of light beams from the plurality of light sources, and to deflect the received plurality of light beams toward one or more surfaces to be scanned. The mirror scanner may include a micro-electro-mechanical systems (MEMS) mirror and an electromagnet portion. The MEMS mirror may comprise a movable unit that may include a mirror portion and a magnet frame portion. The mirror portion may have one or more mirror surfaces. The magnet frame portion may be coupled to the mirror portion, and may support therein a permanent magnet. The MEMS mirror may also comprise a first fixing end and a second fixing end spaced apart from each other and from the movable unit, and a first elastic member and a second elastic member. The first elastic member may elastically support the movable unit to the first fixing end. The second elastic member may elastically support the movable unit to the second fixing end. The electromagnet portion may include a yoke and a coil surrounding the yoke. The yoke may have end portions that are spaced apart from, and facing, each other. The end portions may be arranged adjacent the permanent magnet to thereby provide an electromagnetic driving force to the MEMS mirror.

The optical scanning unit may further comprise a focusing optics configured to focus the plurality of defected light beams deflected by the mirror scanner onto the one or more surfaces to be scanned.

The focusing optics may comprise a arcsinusoidal compensation lens that may apply an arcsinusoidal function to the plurality of deflected light beams so that the light beams deflected by the mirror scanner are scanned at a uniform velocity.

The mirror portion may include a first unit mirror and a second unit mirror, each of which may include a mirror surface on each of two faces of the mirror portion.

At least two of the plurality of light beams that are incident upon a first mirror surface corresponding to at least one of the first and second unit mirrors may be parallel to each other.

The mirror portion may include a single unit mirror that has a mirror surface on each of two faces of the mirror portion.

At least two of the plurality of light beams incident upon the mirror surface on one of the two faces of the unit mirror may each have an oblique incident angle.

According to another aspect an image forming apparatus may be provided to include a plurality of photosensitive media, an optical scanning unit and a developing unit. The optical scanning unit may include a plurality of light sources and a mirror scanner. The mirror scanner may receive a plurality of light beams from the plurality of light sources, and may deflect each of the received plurality of light beams toward the corresponding respective one of plurality of photosensitive media to thereby form electrostatic latent images on the plurality of photosensitive media. The developing unit may be configured to supply toner to develop the electrostatic latent images formed on the photosensitive media. The mirror scanner may comprise a micro-electro-mechanical systems (MEMS) mirror and an electromagnet portion. The MEMS mirror may include a movable unit, which may include a mirror portion and a magnet frame portion. The mirror portion may have one or more mirror surfaces. The magnet frame portion may be coupled to the mirror portion, and may support therein a permanent magnet. The MEMS mirror may also include a first fixing end and a second fixing end, which are spaced apart from each other and from the movable unit. The MEMS mirror may further include a first elastic member and a second elastic member. The first elastic member may elastically support the movable unit to the first fixing end. The second elastic member may elastically support the movable unit to the second fixing end. The electromagnet portion may include a yoke and a coil surrounding the yoke. The yoke may have end portions that are spaced apart from, and facing, each other. The end portions may be arranged adjacent the permanent magnet to thereby provide an electromagnetic driving force to the MEMS mirror.

The mirror portion may include a first unit mirror and a second unit mirror, each of which includes one or more mirror surfaces on each of two face surfaces of the mirror portion. At least two of the plurality of light beams incident upon one of the one or more mirror surfaces may be parallel to each other.

The mirror portion may alternatively include a single unit mirror that has a mirror surface on each of two faces of the mirror portion. At least one of the plurality of light beams incident upon the mirror surface on one of the two races of the unit mirror may have an oblique incident angle.

According to yet another aspect, a light reflective device may be provided for use in an image forming apparatus for scanning light across one or more photosensitive surfaces. The light reflective device may comprise a plate member and at least one elastic member. The plate member may include two substantially planar opposing faces, at least one of which faces supporting thereon one or more light reflective surfaces. The at least one elastic member may elastically support the plate member in such manner to allow an oscillating movement of the plate member about a rotational axis between at least two rotational positions. The rotational axis may be parallel to the two substantially planar opposing faces.

The light reflective device may further comprise a magnet frame that may include an opening to support therein a magnet. The magnet frame being coupled to the plate member so as to cause the plate member to move in association with a movement of the magnet frame.

At least one of the plate member, the magnet frame and the at least one elastic member being of a micro-electro-mechanical systems (MEMS) structure constructed of silicon material.

BRIEF DESCRIPTION OF THE DRAWINGS

Various aspects and/or advantages of the embodiments of the present disclosure will become apparent and more readily appreciated from the following description of the embodiments, taken in conjunction with the accompanying drawings, of which.

DETAILED DESCRIPTION OF SEVERAL EMBODIMENTS

Figure 1:
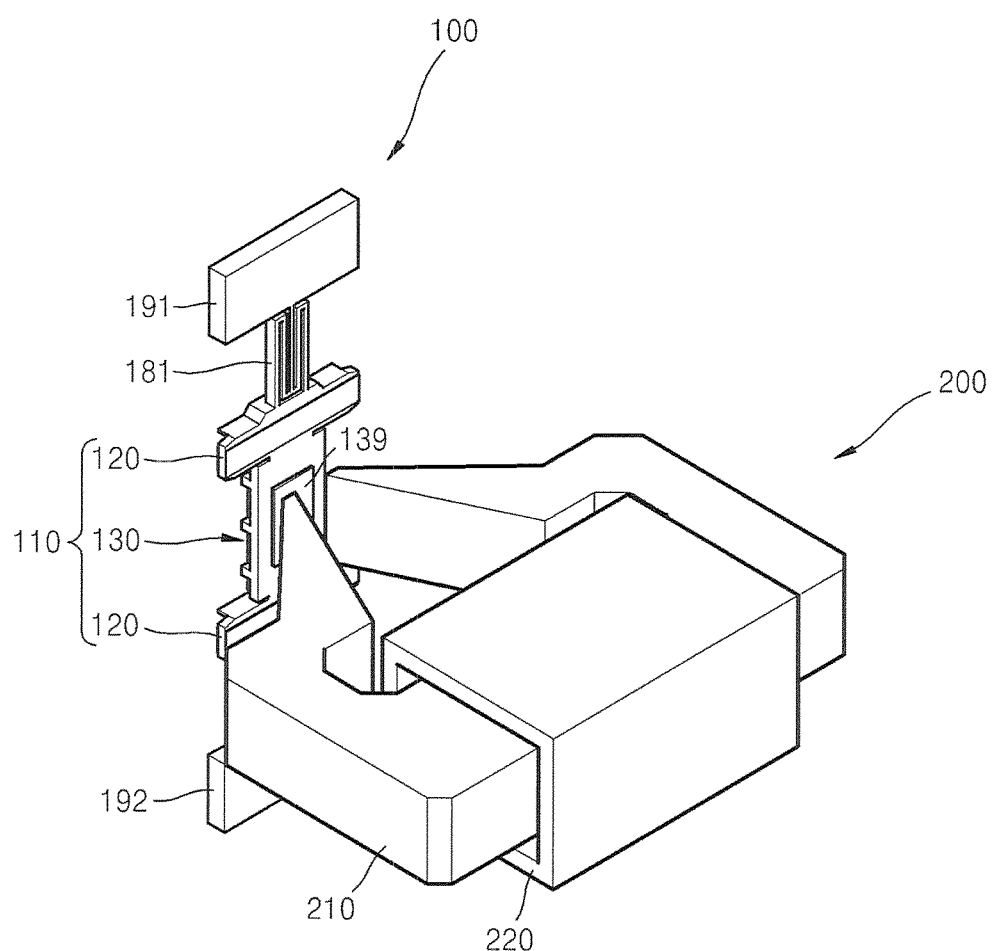
FIG. 1 is a perspective view of a mirror scanner according to an embodiment of the present disclosure.

Several embodiments will now be described more fully with reference to the accompanying drawings. In the drawings, like reference numerals denote like elements, and the sizes and thicknesses of layers and regions may be exaggerated for clarity. While the various embodiments are described for the purpose of providing a thorough and complete disclosure, can have many different forms, the scope of the disclosure should not be construed as being limited to the embodiments specifically set forth herein. It will also be understood that when a layer is referred to as being "on" another layer or substrate, the layer can be disposed directly on the other layer or substrate, or there could be intervening layers between the layer and the other layers or substrate.

According to one or more embodiments of the present disclosure, an optical scanning unit may employ a micro-electro-mechanical systems (MEMS) mirror structure to replace the conventional polygon mirror. The MEMS mirror may be used to perform a uni-directional scanning, which could be at a high speed, and can be fabricated to have a small size using semiconductor fabrication processes. FIG. 1 is a perspective view of a mirror scanner according to an embodiment, and FIGS. 2 and 3 are perspective views respectively showing the front and rear portions of the MEMS mirror 100 shown in FIG. 1.

Figure 2:
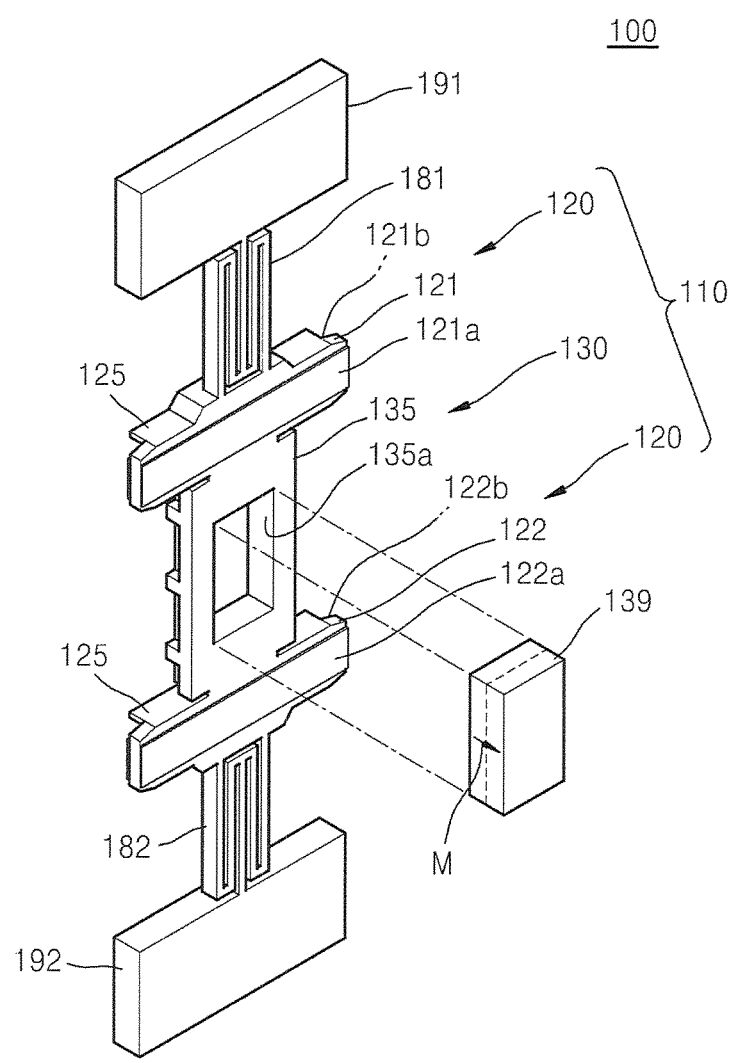
FIG. 2 is an exploded perspective view of the front portion of a micro-electro-mechanical systems (MEMS) mirror shown in FIG. 1.
Figure 3:
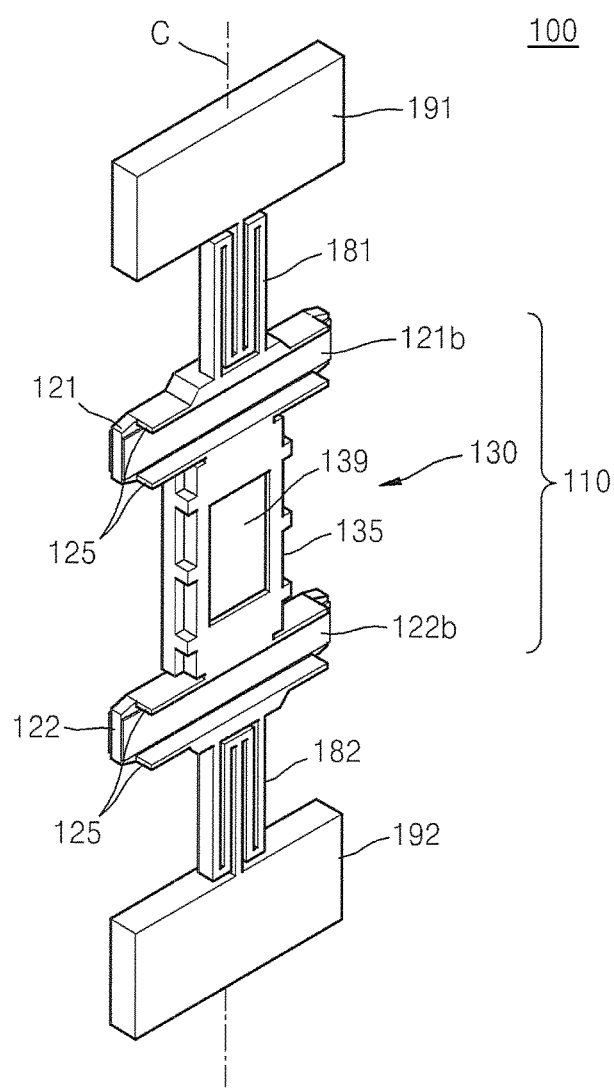
FIG. 3 is a perspective view of the rear portion of the MEMS mirror shown in FIG. 1.

Referring to FIGS. 1 through 3, the mirror scanner according to the present embodiment may include the MEMS mirror 100 formed with a MEMS structure, and an electromagnet portion 200 providing an electromagnetic driving force to the MEMS mirror 100.

The MEMS mirror 100 may include an movable unit 110, a first spring unit 181 and a second spring unit 182 that elastically supports the movable unit 110, and a first fixing end 191 and a second fixing end 192 supporting the first and second spring units 181 and 182, respectively.

The movable unit 110 may be pivoted by the electromagnetic driving force provided by the electromagnet portion 200, and may include one or more mirror portion(s) 120, a reinforcing rib 125 formed on at least one surface of the mirror portion 120, and a magnet frame portion 130 extending from the mirror portion 120. A permanent magnet 139 may be inserted in the magnet frame portion 130.

The mirror portions 120 may include the first and second unit mirrors 121 and 122, which may in turn include the mirror surfaces 121a/121b and 122a/122b, respectively. The mirror surfaces 121a and 121b and 122a and 122b may be formed as thin metal films through a plating process or a deposition process, or can be formed by attaching an additional reflective film to the first and second unit mirrors 121 and 122. A distance between the first and second unit mirrors 121 and 122 may be determined in consideration of the installation space for the magnet frame portion 130. According to the embodiment shown in FIGS. 1 through 3, the mirror portion 120 is shown to include two unit mirrors 121 and 122. However, the present disclosure is so limited, and also contemplates a mirror portion 120 that include only one unit mirror or that includes three or more unit mirrors.

The mirror portion 120 may pivots or oscillate with an oscillation period, which can range, for example, from hundreds to thousands of Hz about the rotating center axis (C in FIG. 3), as will be described in greater detail later. Stress due to the inertia of the oscillating mirror portion 120 may cause the mirror surfaces 121a and 121b and 122a and 122b to be deformed, and the deformation may become severe as the pivoting speed of the mirror portion 120 increases. The deformation of the mirror surfaces 121a, 121b, 122a, and 122b may change the position of the scanned light beam, and thus, result in the degradation of image quality. According to an embodiment, reinforcing rib 125 may be formed on at least a portion of the boundaries of the mirror surfaces 121a, 121b, 122a, and 122b to alleviate the deformation of the mirror surfaces. The reinforcing rib 125 may allow the mirror portion 120 to remain relatively thin while maintaining sufficient rigidity. The thinner profile of the mirror portion 120 may also contribute in the reduction of the moment of inertia of the movable unit 110, which may in turn result in the improvement of the high frequency performance of the movable unit 110, and may also reduce the consumption of power required to operate the mirror scanner.

The reinforcing rib 125 may be formed on one or both surfaces of the mirror portion 120. For example, the reinforcing rib 125 may be formed on one surface of the mirror portion 120 when the MEMS mirror 100 is fabricated using a silicon-on-insulator (SOI) substrate having a dual-layered structure, which will be described in greater detail later. The reinforcing rib 125 may be formed on both surfaces of the mirror portion 120 through a substrate bonding process when, for example, the MEMS mirror 100 is fabricated using a substrate having a triple-layered structure.

As shown in FIG. 3, the reinforcing rib 125 may be formed on both surfaces of the mirror portion 120, and to be perpendicular to the rotating center axis C of the movable unit 110. Since the deformation of the mirror surfaces 121a, 121b, 122a, and 122b may occur in the direction that is perpendicular to the rotating center axis C of the movable unit 110, the deformation of the mirror surfaces can be reduced when the reinforcing rib 125 is formed perpendicular to the rotating center axis C of the movable unit 110.

The magnet frame portion 130 may include a magnet frame 135 and a permanent magnet 139 that can be installed in the magnet frame 135. The magnet frame 135 may be located, e.g., between the first and second unit mirrors 121 and 122. With the magnet frame 135 located between the first and second unit mirrors 121 and 122, the first and second unit mirrors 121 and 122, the first and second spring units 181 and 182, and the first and second fixing ends 191 and 192 can be arranged symmetrically about the magnet frame 135. The magnet frame portion 130 having the above structure separates the first and second unit mirrors 121 and 122 from each other so that the electromagnet portion 200 can be positioned at the space between the light beams scanned by the first and second unit mirrors 121 and 122.

The magnet frame 135 includes an opening 135a in which the permanent magnet 139 may be received. The opening 135a may be formed to extend parallel to the mirror surfaces 121a, 121b, 122a, and 122b, with which structure, the direction (M) of magnetic poles of the permanent magnet 139 being perpendicular to the mirror surfaces 121a, 121b, 122a, and 122b. That is, the magnetic pole direction M of the permanent magnet 139 may be parallel to the direction in which the permanent magnet 139 is received into the magnet frame 135. For example, the permanent magnet 139 can be inserted so that the N pole of the permanent magnet 139 faces the electromagnet portion 200. The relationship between the magnetic pole direction M of the permanent magnet 139 and the electromagnet portion 200 will be described in greater detail later.

Figure 4A:
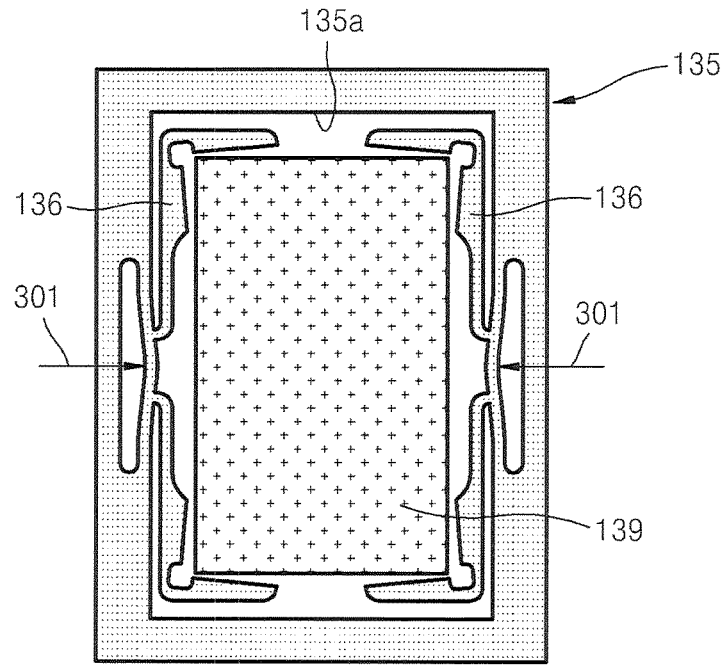
FIGS. 4A and 4B are schematic diagrams showing a grip structure of a magnet frame portion of the MEMS mirror of FIG. 1.
Figure 4B:
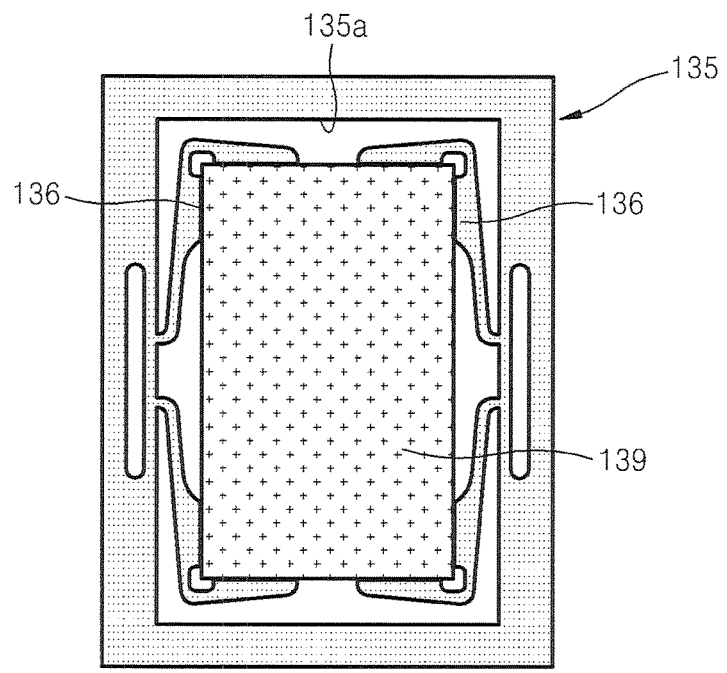

The opening 135a may include a grip structure 136 on the side wall thereof, as shown in FIGS. 4A and 4B, so that the permanent magnet 139 can be supported in the magnet frame 135. Referring to FIG. 4A, when a force 301 is applied to the skies of the grip structure 136, the permanent magnet 139 is able to move within the opening, and can thus be inserted into, or removed from, the magnet frame 135. Referring to FIG. 4B, when the force is not applied to the grip structure 136, the grip structure 136 securely holds the permanent magnet 139. The grip structure 136 shown in FIGS. 4A and 4B is only an example, and can be modified into variety of other configurations.

The first and second spring units 181 and 182 respectively connect the movable unit 110 to the first and second fixing ends 191 and 192, and elastically support the movable unit 110.

According to an embodiment, the first and second spring units 181 and 182 may be formed in zigzagging shape. The zigzag shape may disperse the stress generated during the pivoting of the movable unit 110 in the limited space, and thus may reduce stress related failures. In addition, the elastic resilience of the first and second spring units 181 and 182 is a factor that determines a resonant frequency of the movable unit 110 with the moment of inertia of the movable unit 110. Therefore, the resonant frequency of the movable unit 110 can be adjusted by the appropriate design of the zigzag shape of the first and second spring units 181 and 182.

The first and second fixing ends 191 and 192 support the first and second spring units 181 and 182. The first and second fixing ends 191 and 192 may also include holes (not shown) so as to facilitate assembling of the MEMS mirror 100 with other structures.

Figure 10:
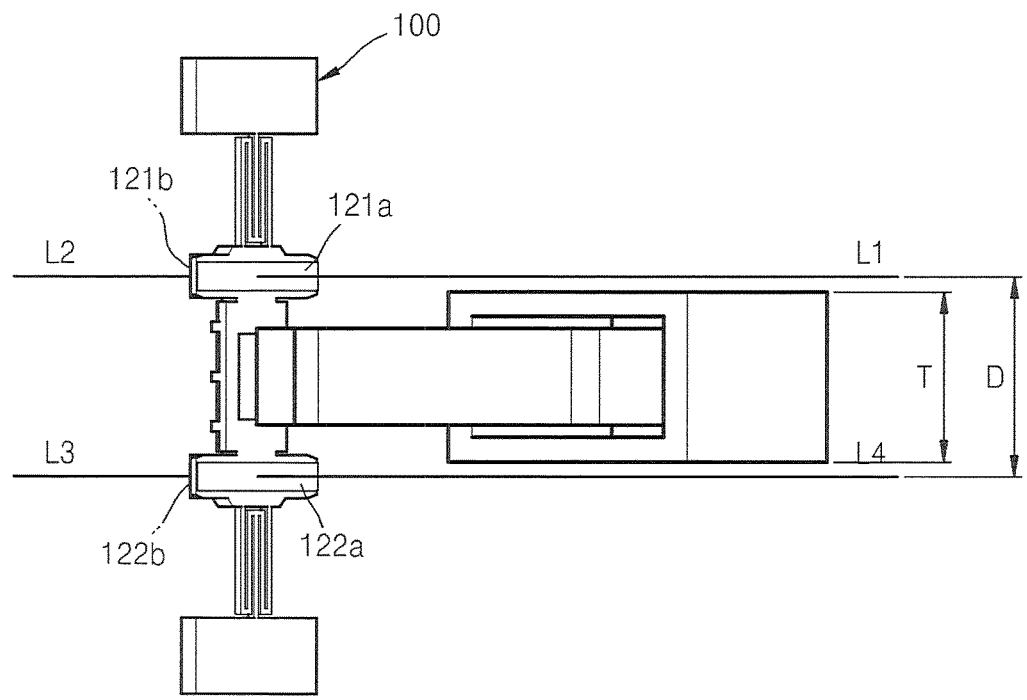
FIG. 10 shows parallel light beams incident on the mirror scanner of FIG. 1.

The electromagnet portion 200 includes a yoke 210, and a coil 220 surrounding the yoke 210. The electromagnet portion 200 is designed to have a thickness T (see FIG. 10) that is less than the distance D between the first and second unit mirrors 121 and 122 so as not to interfere with the paths of the light beams to and from the first and second unit mirrors 121 and 122 (refer to L1 and L4 of FIG. 10), and is disposed between the parallel light beams L1 and L4 that are incident on the first and second unit mirrors 121 and 122 as shown in FIG. 10.

The yoke 210 defines a path of a magnetic flux (refer to B of FIG. 8), which is formed by the electric current flow in the coil 220. The yoke 210 may be formed of a soft magnetic material. The yoke 210 includes ends (refer to A1 and A2 of FIG. 8) that are spaced apart from, and face, each other, the magnetic flux exiting from both of the ends A1 and A2. The ends A1 and A2 of the yoke 210 are positioned adjacent to the permanent magnet 139, and the shapes of the ends A1 and A2 of the yoke 210 may vary depending on the shape of the permanent magnet 139. For example, when the permanent magnet 139 is formed as a rectangular parallelepiped, the ends A1 and A2 of the yoke 210 may be formed to be straight. The shape of the permanent magnet 139 and the ends of the yoke 210 however are not limited to the above example. For example, when the permanent magnet 139 is formed as a cylinder, ends A1 and A2 of the yoke 210 may be formed as coaxial cylindrical surfaces.

A method of fabricating the MEMS mirror 100 will be described with reference to FIGS. 5, 6, and 7A-to 7C

Figure 5:
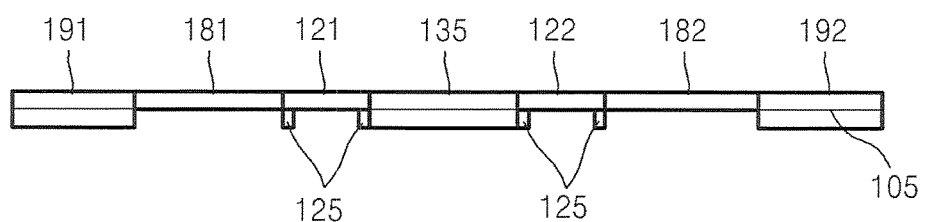
FIG. 5 is a side view of the MEMS mirror of FIG. 1.

FIG. 5 is a side view of the MEMS mirror 100. A body of the MEMS mirror 100 may be formed of a silicon-on-insulator (SOI) wafer, which may be used to form most of the MEMS mirror 100 except for the permanent magnet 139 and/or the reflective surfaces of the mirrors. The SOI wafer is a silicon substrate including an insulating layer in an intermediate portion thereof, and is an example of double-layered wafer. As shown in FIG. 5, the body of the MEMS mirror 100 can be divided into an upper portion and a lower portion based on an insulating layer 105. For example, the first and second unit mirrors 121 and 122 and the first and second spring units 181 and 182 may be formed with a first silicon layer above the insulating layer 105, and the reinforcing rib 125 may be formed with a second silicon layer under the insulating layer 105. The magnet frame 135 and the first and second fixing ends 191 and 192 may, for example, be formed with both of the first and second silicon layers. As described above, when the double-layered wafer is used, the body of the MEMS mirror 100, including the reinforcing rib 125, may be formed through a single wafer process. In the example shown in FIG. 5, the body of the MEMS mirror 100 is formed using the SOI wafer, however, the present disclosure is not limited to the above example. For example, the body of the MEMS mirror 100 may be formed by bonding two substrates. Moreover, the reinforcing rib 125 may be formed on upper and lower portions of the first and second unit mirrors 121 and 122 using a triple-layered substrate.

Figure 6:
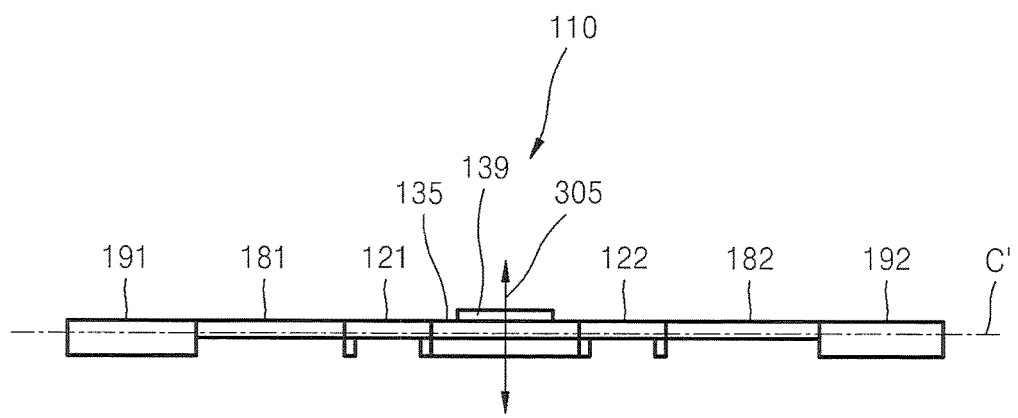
FIG. 6 is a schematic diagram of a permanent magnet, of which the insertion position can be adjusted in upward and downward directions, in the MEMS mirror of FIG. 1.
Figure 7A:
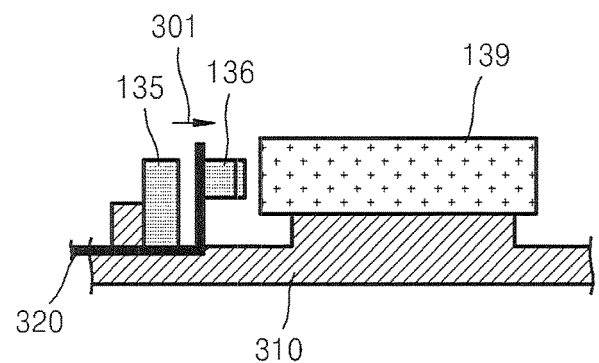
FIGS. 7A through 7C are schematic diagrams illustrating processes of inserting the permanent magnet into the magnet frame portion.
Figure 7B:
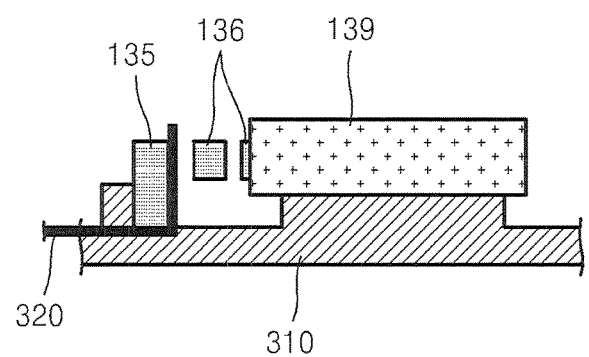
Figure 7C:
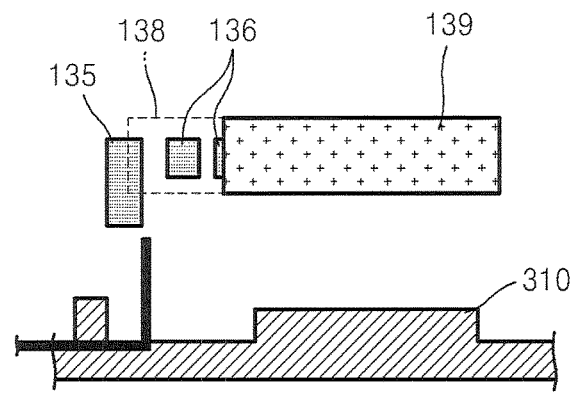

FIGS. 6, and 7A through 7C illustrate processes of inserting the permanent magnet 139 into the magnet frame 135. FIG. 6 shows the permanent magnet 139, of which the installed position can be adjusted in upward and downward directions 305, in the body of the MEMS mirror 100, and FIGS. 7A through 7C illustrate processes of inserting the permanent magnet 339 into the magnet frame 135.

Referring to FIG. 6, a center of gravity of the entire movable unit 110 varies according to the position of the permanent magnet 339 within the magnet frame 135 due to the weight of the permanent magnet 139. Therefore, the center of gravity of the movable unit 110 can be made to coincide with the rotating center axis C' of the first and second spring units 181 and 182 by adjusting the position of the permanent magnet 139 in the upward and downward directions 305. That is, the rotating center axis C of the movable unit 110 and the rotating center axis C' of the first and second spring units 181 and 182 can be made to coincide with each other by adjusting the position of the permanent magnet 139 within the magnet frame 135. The rotating center axis C' of the first and second spring units 181 and 182 is the rotating center axis only with respect to the rotation of the first and second spring units 181 and 182. As described above, when the rotating center axis C of the movable unit 110 and the rotating center axis C' of the first and second spring units 181 and 182 coincide with each other, vibrations of the operation unit 110 during the pivoting of the movable unit 110 about the rotating center axis C can be reduced.

Referring to FIG. 7A, when the force 301 is applied by a chuck 320 on the grip structure 136 in the magnet frame 135, which is placed on an assembling jig 310, the grip structure 136 disengages with the permanent magnet 139 (as also shown in FIG. 4A), and thus, the permanent magnet 139 can be inserted into the magnet frame 135. With the grip structure 136 disengaged with the permanent magnet 139, the position of the permanent magnet 139 may be controlled using the assembling jig 310 so that the rotating center axis C of the movable unit 110 (refer to FIG. 3) and the rotating center axis C' of the first and second spring units 181 and 182 (refer to FIG. 6) can be made to coincide. Then, referring to FIG. 7B, the chuck 320 is retrieved so that the grip structure 136 engages with the permanent magnet 139 to support the permanent magnet 139 in place at the proper position. The permanent magnet 139 may be fixed in position within the magnet frame 135 using a fixing member 138, such as, e.g., epoxy. As described above, the center of gravity of the movable unit 110 can be adjusted by inserting the permanent magnet 139 in the magnet frame 135. Moreover, the permanent magnet 139 can be held in position within the magnet frame 135 using the grip structure 136 formed in the magnet frame 135.

Figure 8:
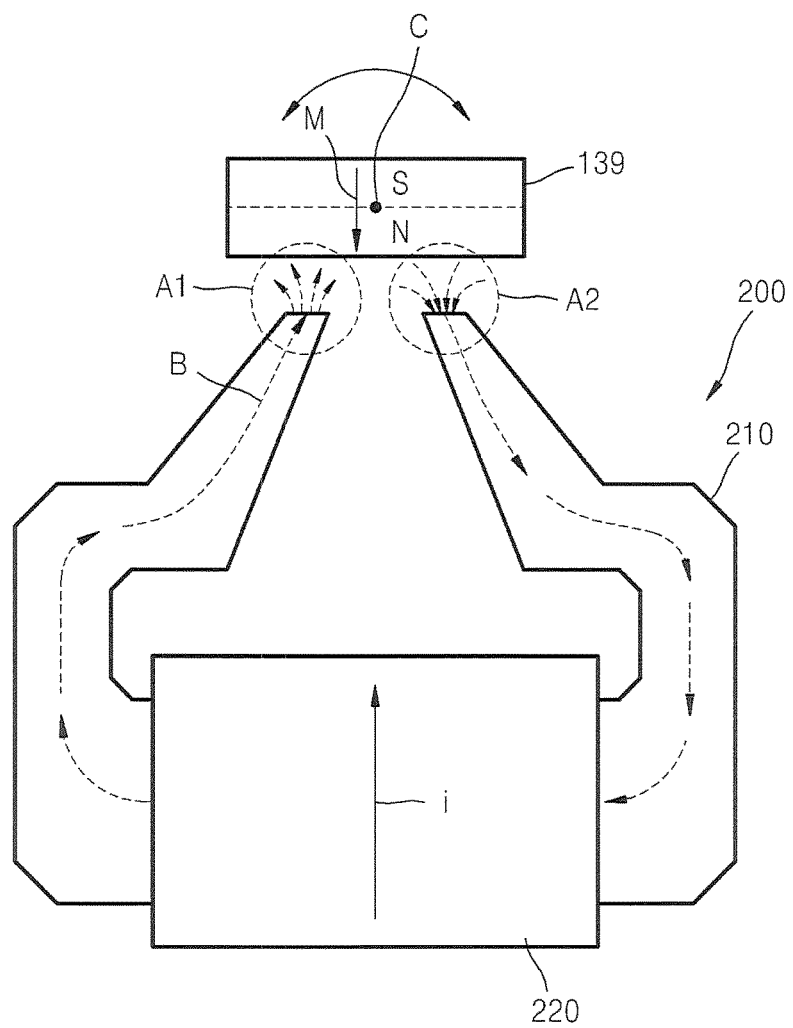
FIG. 8 is a schematic diagram illustrating the force applied to the permanent magnet by an electromagnet portion.
Figure 9:
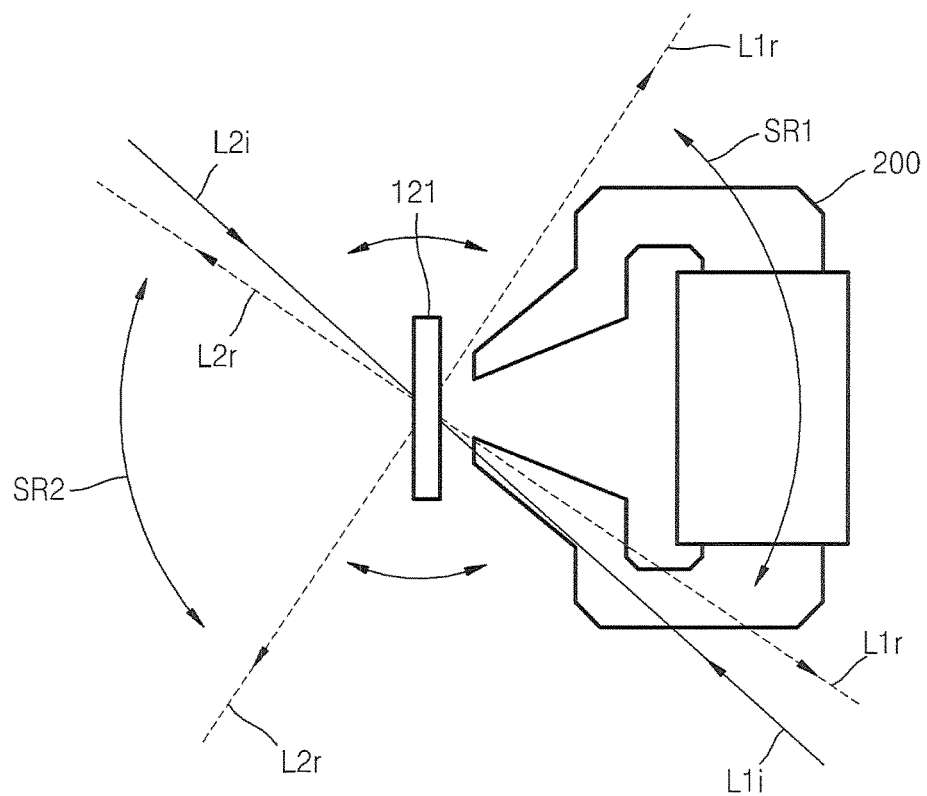
FIG. 9 shows a range of scanning light beams according to the rotation of a mirror portion.
Figure 11:
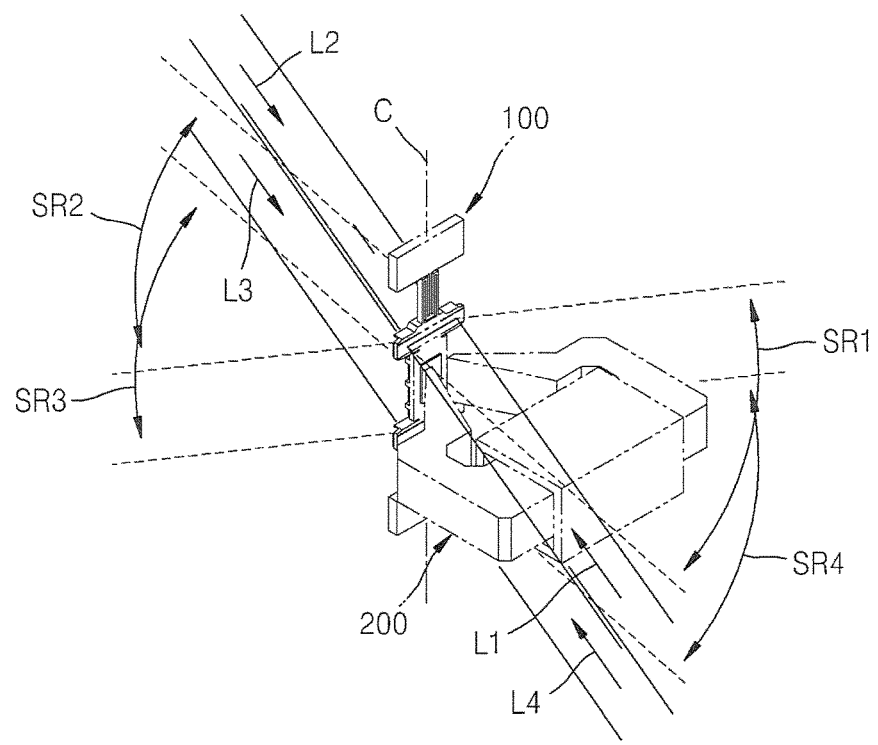
FIG. 11 is a schematic diagram showing light beams scanned by the mirror scanner of FIG. 1.

FIGS. 8 through 11 illustrate the operations of the mirror scanner according to an embodiment. FIG. 8 illustrates the force applied to the permanent magnet 139 by the electromagnet portion 200, and FIG. 9 shows a range of scanning light beams according to the rotation of the mirror portion 120. In addition, FIG. 10 illustrates the light beams that are incident onto the mirror scanner, and FIG. 11 illustrates the light beams scanned by the mirror scanner according to the present embodiment.

Referring to FIG. 8, the end portions A1 and A2 of the yoke 210 face each other around the N pole of the permanent magnet 139. When electric current i flows through the coil 220 of the electromagnet portion 200, the magnetic flux B is induced in the yoke 210, and the magnetic flux B is emitted at the end portions A1 and A2 of the yoke 210. For example, when the electric current i flows in the direction shown in FIG. 8, the magnetic flux B exits at the end portion A1 of the yoke 210 and enters the end portion A2 of the yoke 210. That is, the end portion A1 becomes N pole, and the end portion A2 becomes S pole. On the other hand, the magnetic pole direction M of the permanent magnet 139 is set with the N pole at the side facing the yoke 210 and the S pole at the opposite side. In this case, a repulsive force is applied to the permanent magnet 139 around the end portion A1 by the magnetic flux B of the electromagnet portion 200, and an attractive force is applied to the permanent magnet 139 around the end portion A2. Accordingly, the permanent magnet 139 pivots about the rotating center axis C in the clockwise direction. When the flowing direction of the electric current i is changed, the magnetic polarities of the end portions A1 and A2 reverses. Accordingly, the forces applied to the permanent magnet 139 are also reversed, and as a result the permanent magnet 139 pivots about the rotating center axis C in the counter-clockwise direction. As described above, the pivoting direction of the permanent magnet 139 can be determined by controlling the direction of the current flow i in the electromagnet portion 200.

On the other hand, when the mirror portion 120 and the magnet frame portion 130 are fixedly coupled to each other as in this example, the pivoting of the permanent magnet 139 and the magnet frame portion 130 directly results in pivoting of the mirror portion 120. If the operating frequency of the current i supplied to the electromagnet portion 200 is the resonant frequency of the movable unit 110, the movable unit 110 vibrates in a sine waveform in a resonance mode. The resonant frequency of the movable unit 110 may be determined by the relationship between the moment of inertia of the movable unit 110 and the elastic resilience of the first and second spring units 181 and 182.

Referring to FIG. 9, when first and second incident light beams L1$i$ and L2$i$ are incident on the first unit mirror 121 that oscillates at the resonant frequency, first and second reflected light beams L1$r$ and L2$r$ reflected by the first unit mirror 121 are scanned across within the scanning region ranges denoted as SR1 and SR2, respectively, The mirror scanner may include the first and second unit mirrors 121 and 122 (as shown, e.g., in FIG. 2), and thus, four light beams: first through fourth light beams L1, L2, L3, and L4 can be simultaneously scanned, as shown in FIGS. 10 and 11. That is, the first and second light beams L1 and L2 may be reflected by the mirror surfaces 121$a$ and 121$b$ of the first unit mirror 121, and may thereby be scanned across the scanning region ranges SR1 and SR2 while the third and fourth light beams L3 and L4 may be reflected by the mirror surfaces 122$a$ and 122$b$ of the second unit mirror 122, and may thus be scanned across the scanning region ranges SR3 and SR4.

Figure 12:
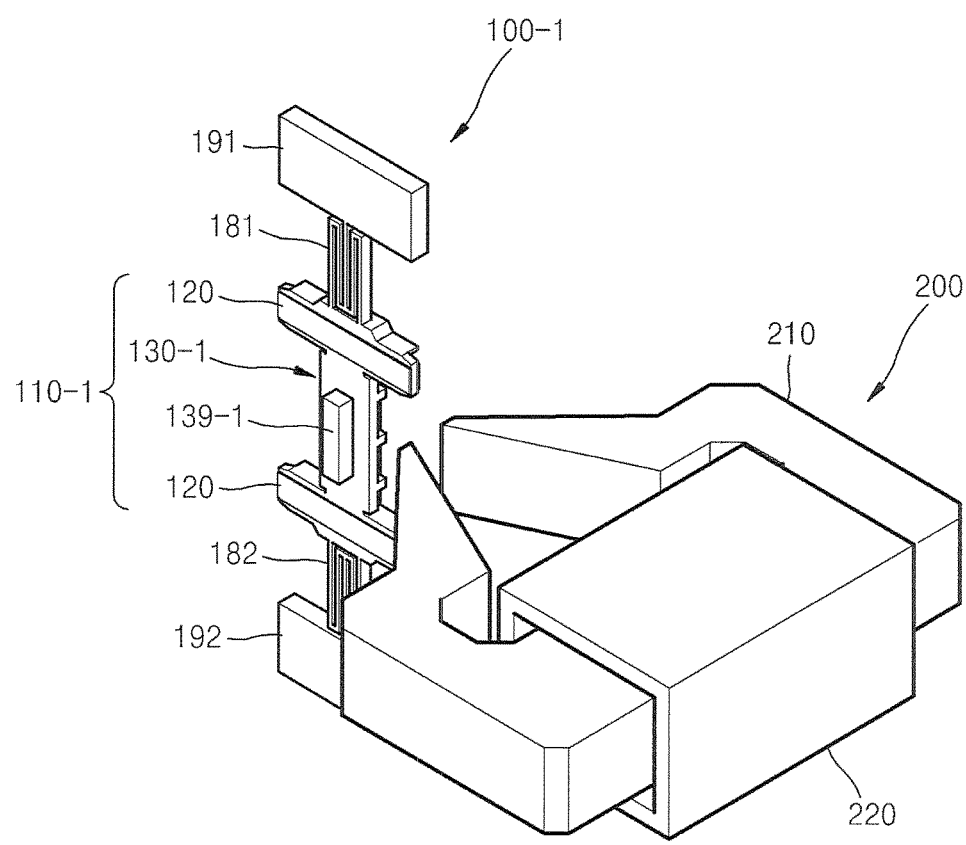
FIG. 12 is a schematic diagram showing a structure of a mirror scanner according to another embodiment.
Figure 13:
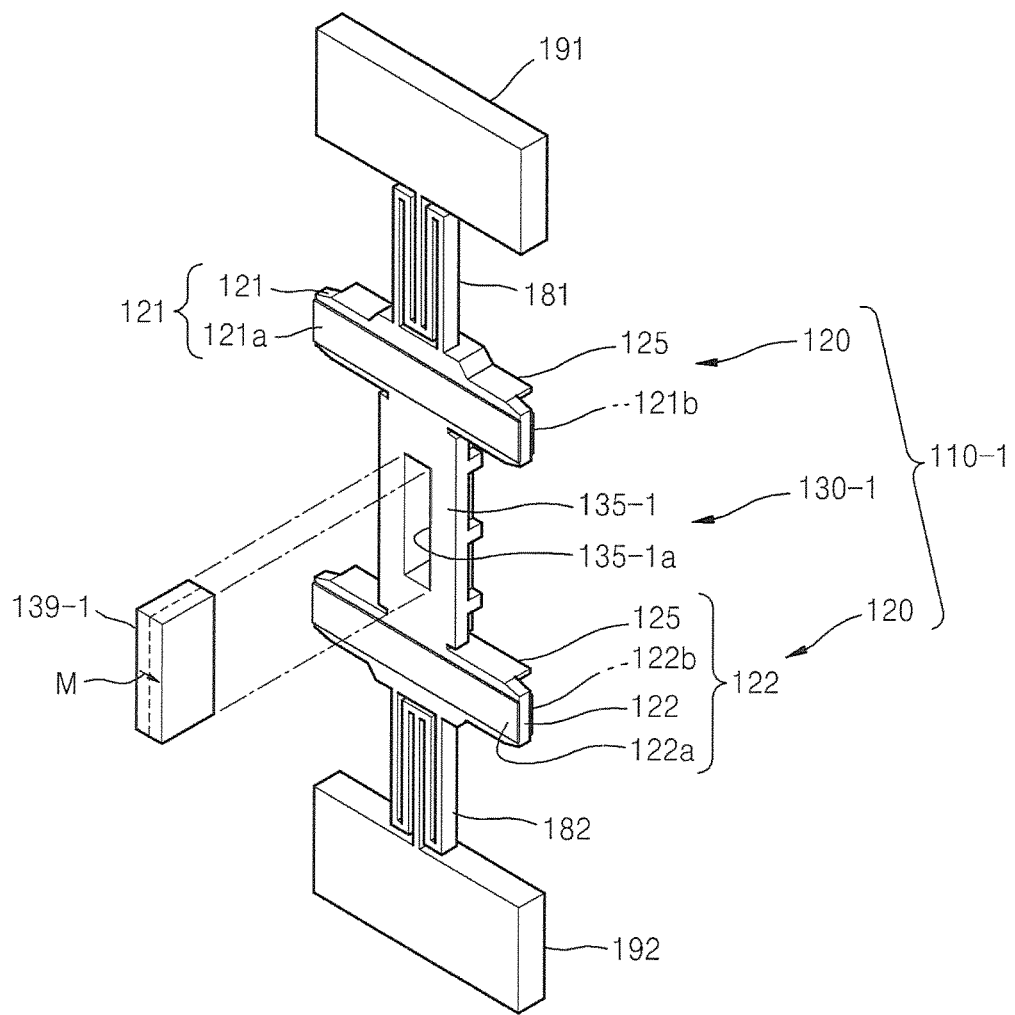
FIG. 13 is an exploded perspective view of the front portion of the MEMS mirror shown in FIG. 12.
Figure 14:
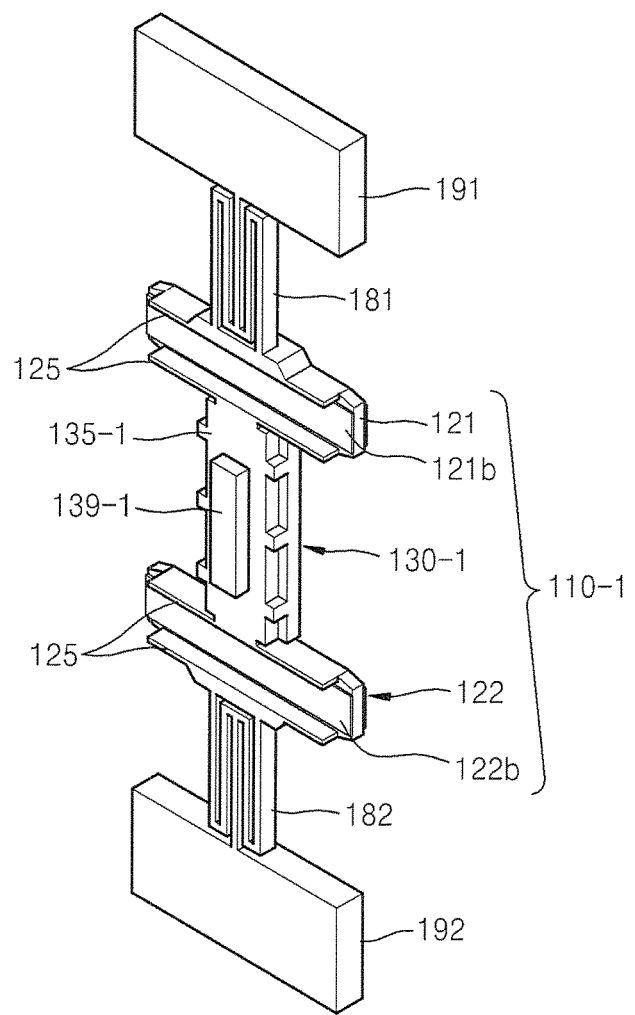
FIG. 14 is a perspective view of a rear portion of the MEMS mirror of FIG. 12.

FIG. 12 is a schematic diagram showing a structure of a mirror scanner according to another embodiment, and FIGS. 13 and 14 are perspective views showing the front and rear portions of a MEMS mirror 100-1 shown in FIG. 12.

The mirror scanner according to the embodiment is substantially the same as the mirror scanner according to the previous embodiment shown in FIGS. 1 through 11 except for a magnetic pole direction M of a permanent magnet 139-1. For the sake of brevity, like elements are denoted by like reference numerals, and descriptions of the previously described like elements may not be repeated in detail.

Referring to FIGS. 12 through 14, the mirror scanner according to an embodiment may include a MEMS mirror 100-1, and the electromagnet portion 200 providing an electromagnetic driving force to the MEMS mirror 100-1.

The MEMS mirror 100-1 may include a movable unit 110-1, the first and second spring units 181 and 182 elastically supporting the movable unit 110-1, and the first and second fixing ends 191 and 192 respectively supporting the first and second spring units 181 and 182.

The movable unit 110-1 may include the mirror portion 120, the reinforcing rib 125 formed on at least one surface portion of the mirror portion 120, and a magnet frame portion 130-1 extending from the mirror portion 120. The permanent magnet 339-1 may be received in the magnet frame portion 130-1. The mirror portion 120 may include the first and second unit mirrors 121 and 122, each of which may in turn include on both surfaces thereof respective mirror surfaces 121$a$/121$b$, and 122$a$/122$b$. In addition, the mirror portion 120 may includes the reinforcing rib 125 for improving the rigidity of the mirror portion 120.

The magnet frame 135-3 may include an opening 135$a$ into which the permanent magnet 139-1 may be received. The opening 135$a$ may be formed to extend parallel to the mirror surfaces 121$a$, 121$b$, 122$a$, and 122$b$. In the embodiment shown in FIG. 13, as shown in the figure, the magnetic pole direction M of the permanent magnet 139-1 may be parallel to the mirror surfaces 121$a$, 121$b$, 122$a$, and 122$b$, and may be perpendicular to the rotating center axis C (refer to FIG. 3). That is, while, in the embodiments shown in FIGS 1-11, the magnetic poles of the permanent magnet 139 were seen from the view showing the wider surface of the MEMS mirror 100 (see FIG. 2), according to the embodiments shown in FIG. 13, the poles of the permanent magnet 139-1 are shown when the permanent magnet 139-1 is seen from a side of the MEMS mirror 100-1.

Since the magnetic pole direction M of the permanent magnet 139-1 is changed, the arrangements of the MEMS mirror 100-1 and the electromagnet portion 200 may be different from those of the previous embodiments. That is, in the previous embodiment, the ends A1 and A2 of the yoke 210 face the larger surface of the MEMS mirror 100 when the MEMS mirror 100 is in the initial non-operating position as shown in FIG. 1. However, according to the embodiments of FIG. 13, the ends A1 and A2 of the yoke 210 face the side of the MEMS mirror 100-1 when the MEMS mirror 100-1 is in the initial non-operating position as shown in FIG. 12.

Since one of the poles of the permanent magnet 139-1 is shown when the permanent magnet 139-1 is seen from the side of the MEMS mirror 100-1, the end portions of the yoke 210 face the pole of the permanent magnet 139-1, similarly as in the previously described embodiments. Therefore, the operation of the mirror scanner, which is described with reference to FIG. 8, also applies to the embodiments of FIGS. 12-14.

Figure 15:
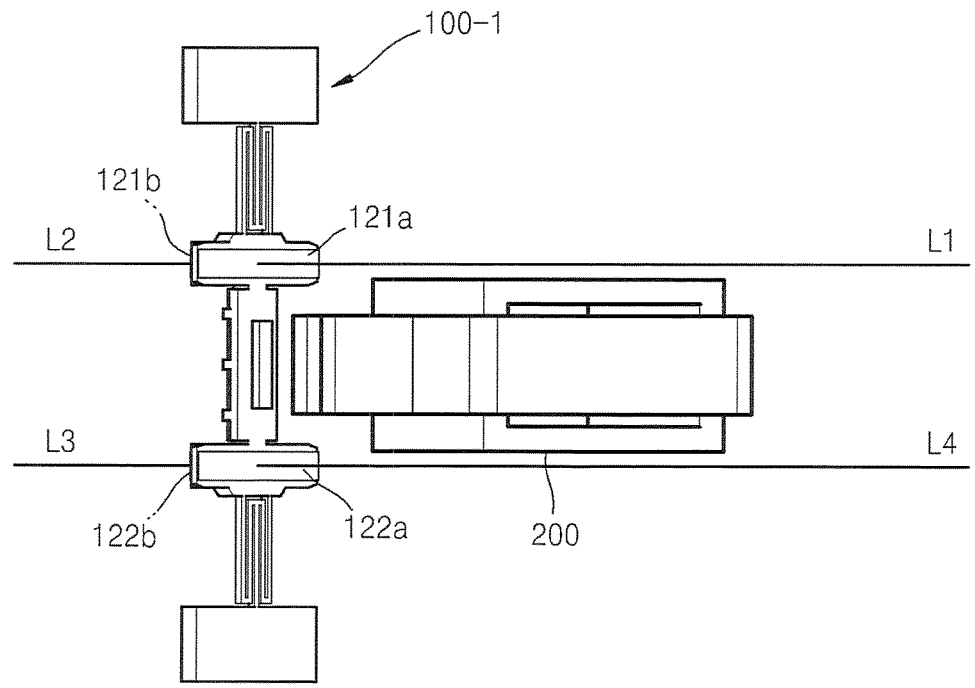
FIG. 15 is a schematic diagram showing parallel light beams incident on the mirror scanner of FIG. 12.

FIG. 15 illustrates the light beams incident on the mirror scanner of the embodiments of FIGS. 12-14, and FIG. 16 illustrates the light beams scanned by the mirror scanner.

Figure 16:
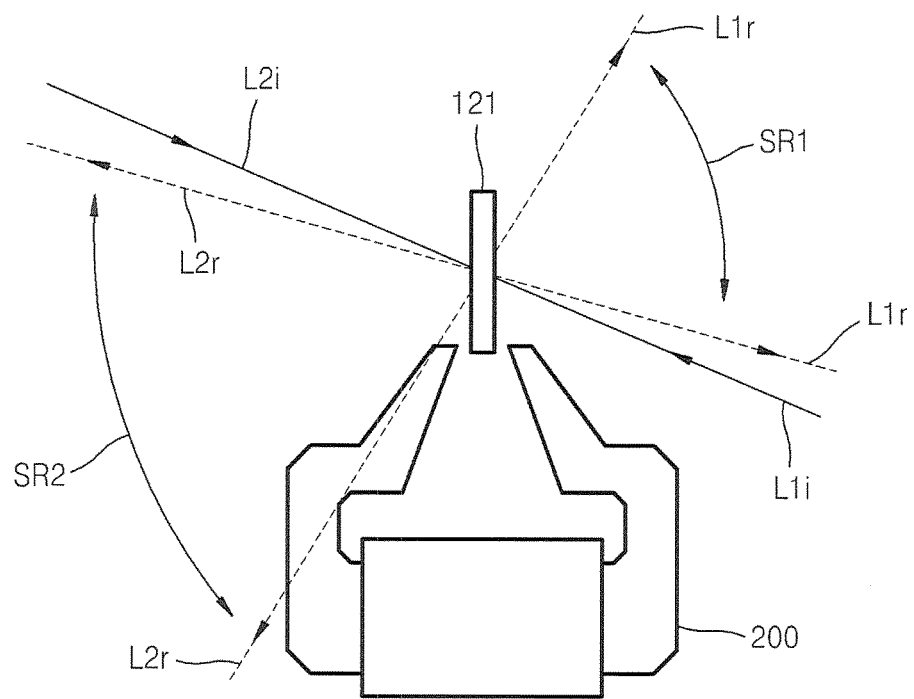
FIG. 16 is a schematic diagram showing light beams scanned by the mirror scanner of FIG. 15.

Referring to FIG. 15, since the mirror scanner includes four mirror surfaces 121$a$, 121$b$, 122$a$, and 122$b$, four light beams L1, L2, L3, and L4 may simultaneously be scanned. Since the electromagnet portion 200 is located at the side of the MEMS mirror 100-1, the electromagnet portion 200 may be placed not to interfere with the light paths of the incident light beams L1$i$ and L2$i$ or the reflected light beams L1$r$ and L2$r$ as shown in FIG. 16, and accordingly, the installation space of the electromagnet portion 200 can easily be ensured.

Figure 17:
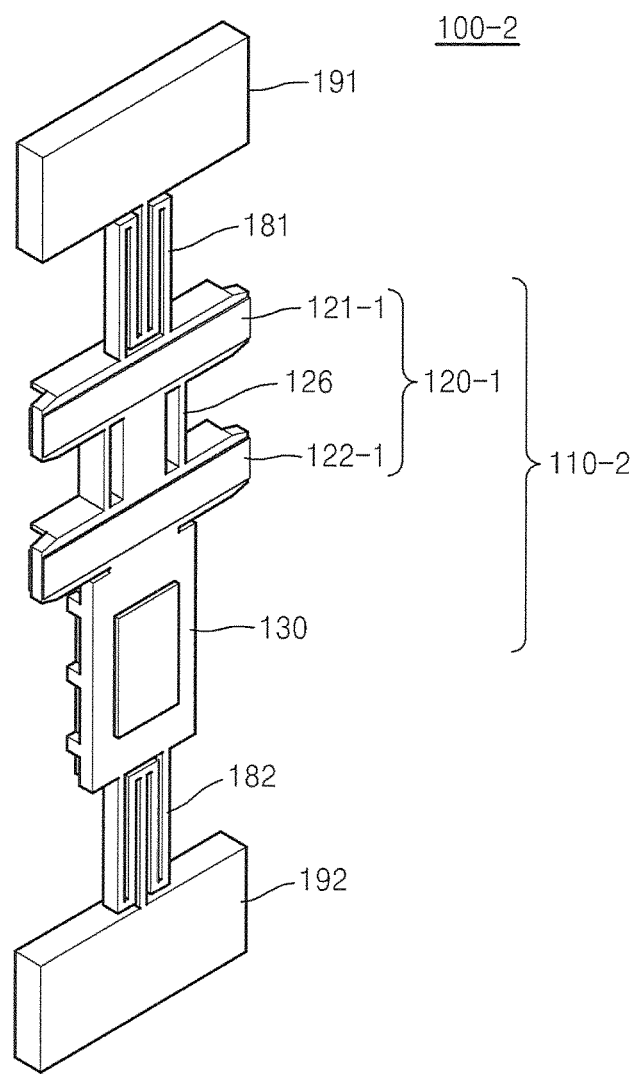
FIG. 17 is a schematic diagram showing a structure of a mirror scanner according to another embodiment.
Figure 18:
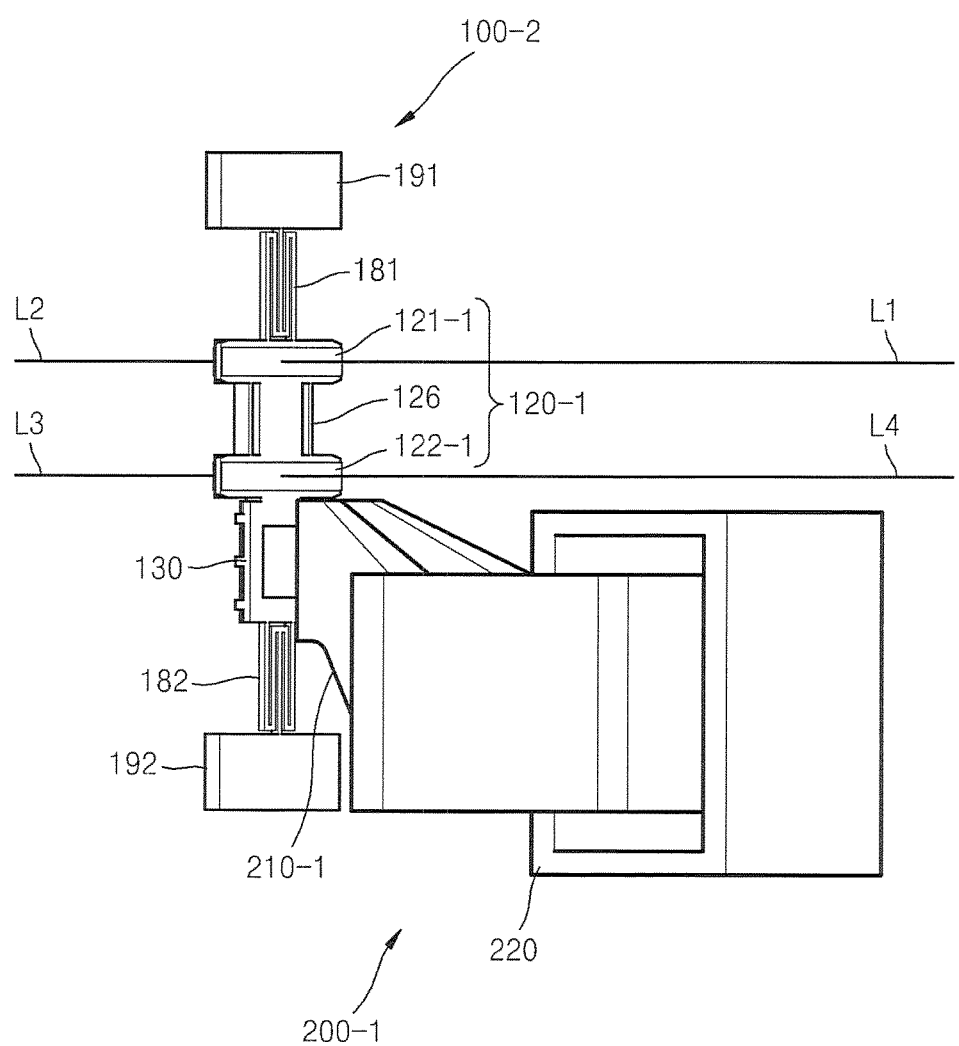
FIG. 18 is a schematic diagram showing parallel light beams incident on the mirror scanner of FIG. 17.

FIG. 17 is a schematic diagram showing a structure of a mirror scanner according to another embodiment, and FIG. 18 shows parallel light beams incident on the mirror scanner of FIG. 17.

The mirror scanner of the embodiments shown in FIG. 17 may be substantially the same as the mirror scanner shown in FIGS. 1 through 11, except that the magnet frame portion 130 is disposed below the mirror portion 120-1. Again, for brevity sake, like elements are denoted by like reference numerals, and the detailed descriptions of the like elements already described may not be repeated.

Referring to FIGS. 17 and 18, the mirror scanner according to the embodiments may include a MEMS mirror 100-2, and an electromagnet portion 200-1 providing an electromagnetic driving force to the MEMS mirror 100-2.

The MEMS mirror 100-2 may include a movable unit 110-2, the first and second spring units 181 and 182 elastically supporting the movable unit 110-2, and the first and second fixing ends 191 and 192 respectively supporting the first and second spring units 181 and 182. The movable unit 110-2 may include the mirror portion 120-1 in which first and second unit mirrors 121-1 and 122-1 are fixedly coupled to each other via a rigid connection unit 126, and the magnet frame portion 130 disposed to extend from the mirror portion 120-1. A rigid connection unit 126 is disposed between the first and second unit mirrors 121-1 and 122-1, and determines a predetermined distance between the mirrors. The rigid connection unit 126 may be of sufficient rigidity so as not to twist, and thus, the first and second unit mirrors 121-1 and 122-1 may pivot simultaneously with respect to each other.

According to the embodiments, since the magnet frame portion 130 is disposed on one side, e.g., at the lower side, of the mirror portion 120-1, the electromagnet portion 200-1 is also disposed on the same side the mirror portion 120-1. That is, in contrast to the previous embodiments, there is no need to dispose the electromagnet portion 200-1 between the first and second unit mirrors 121-1 and 122-1, and thus a sufficient space for the installation of the electromagnet portion 200-1 can be ensured. Moreover, as shown in FIG. 18, according to an embodiment, the end portions of a yoke 210-1 may be stepped or curved to be adjacent to the magnet frame portion 130 while the remaining portion of the electromagnet portion 200-1 (except for the end portions of the yoke 210-1) can be arranged to be out of and away from the optical paths of the incident or reflected light beams L1, L2, L3, and L4. According to the embodiments, since a sufficient space for installing the electromagnet portion 200-1 can be ensured, there may not be a limitation for the thickness of the electromagnet portion 200-1.

The magnetic pole direction of the permanent magnet that is inserted into the magnet frame portion 130 may be either perpendicular or parallel to the mirror surfaces, in addition, the end portions of the yoke 210-1 may face either the broad face of the MEMS mirror 100-2 or the side of the MEMS mirror 100-2 according to the magnetic pole direction of the permanent magnet.

Figure 19:
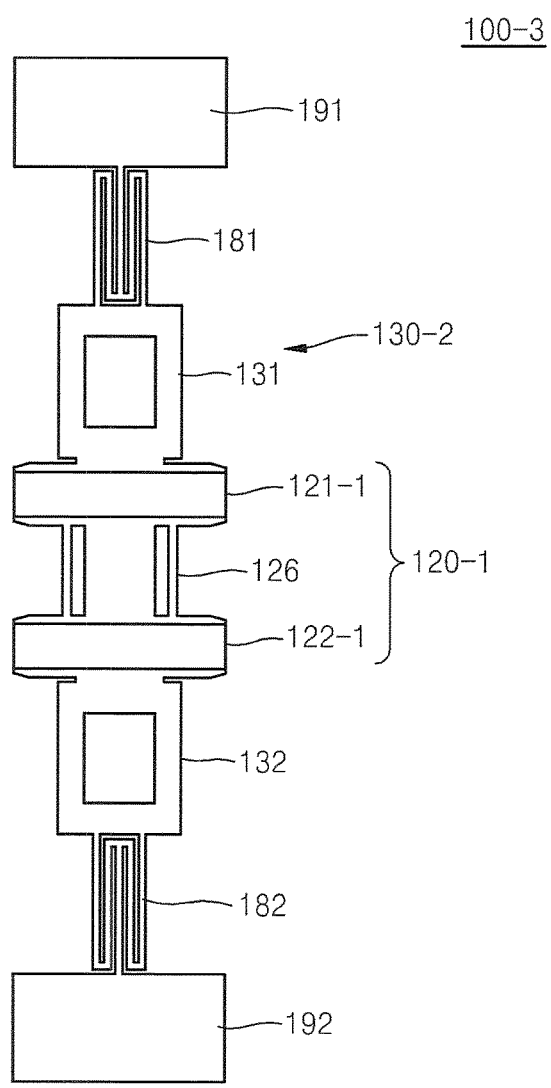
FIG. 19 is a schematic diagram showing the structure of a mirror scanner according to another embodiment.

FIG. 19 is a schematic diagram showing a structure of a mirror scanner according to another alternative embodiments.

Referring to FIG. 19, the mirror scanner of the embodiment comprises a MEMS mirror 100-3 which may be substantially the same as the MEMS mirror shown in FIGS. 17 and 18, except for the arrangement of a magnet frame portion 130-2.

The magnet frame portion 130-2 of the present embodiment includes a first magnet frame 131 located between the mirror portion 120-1 and the first spring unit 181, and a second magnet frame 132 located between the mirror portion 120-1 and the second spring unit 182. Each of the first and second magnet frames 131 and 132 may include a first electromagnet portion and a second electromagnet portion (not shown). Since the first and second magnet frames 131 and 132 are each disposed to extend from the mirror portion 120-1, both of the corresponding first and second electromagnet portions may also be disposed away from the mirror portion 120-1, similarly with the electromagnet portion 200-1 shown in FIG. 17. With the above described structure, as the first and second magnet frames 131 and 132 are symmetrically disposed about the mirror portion 120-1, the driving property of the MEMS mirror 100-3 can be improved.

Figure 20:
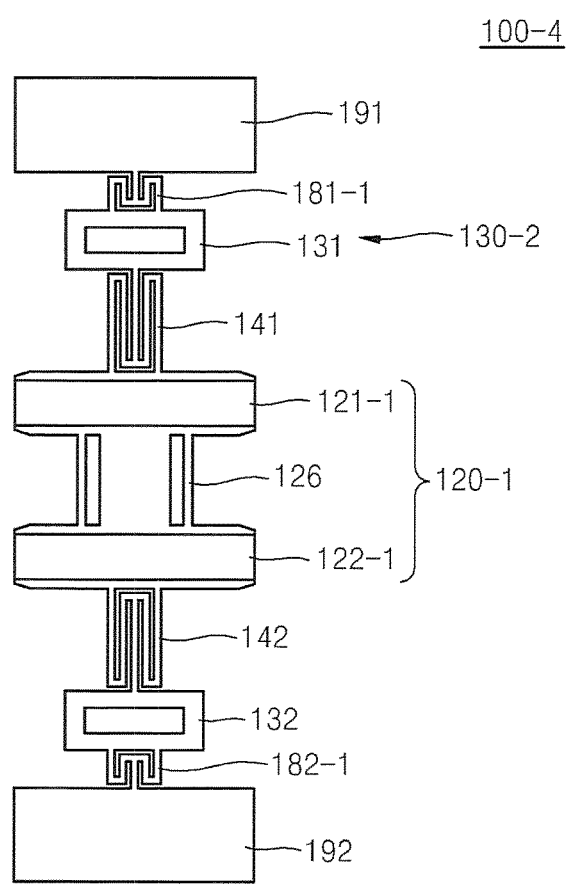
FIG. 20 is a schematic diagram showing the structure of a mirror scanner according to another embodiment.

FIG. 20 is a schematic diagram showing a structure of a mirror scanner according to other alternative embodiments.

Referring to FIG. 20, the mirror scanner of the present embodiment is substantially the same as the mirror scanner shown in FIG. 19, except that the magnet frame portion 130-2 and the mirror portion 120-1 are elastically supported with respect to one another.

The MEMS mirror 100-4 may include a first sub-spring unit 341 between the mirror portion 120-1 and the first magnet frame 131, and a second sub-spring unit 142 between the mirror portion 120-1 and the second magnet frame 132. In addition, the first magnet frame 131 is elastically supported by a first spring unit 181-1 and the first fixing end 191 while the second magnet frame 132 is elastically supported by the second spring unit 182-1 and the second fixing end 192.

As described above, since the first and second magnet frames 131 and 132 are elastically supported between the mirror portion 120-1 and the first and second fixing ends 191 and 192, the magnet frame portion 130-2 and the mirror portion 120-1 may be in different resonance modes from each other. That is, the resonance mode of the magnet frame portion 130-2 is mainly in a first resonance frequency that is determined by the moment of inertia of the magnet frame portion 130-2 itself and the elastic resilience of the first and second spring units 181-1 and 181-2. In addition, the resonance mode of the mirror portion 120-1 is mainly in a second resonance frequency that is determined by the moment of inertia of the mirror portion 120-1 and the elastic resilience of the first and second sub-spring units 141 and 142. According to an embodiment, the first resonance frequency may be set to be greater than the second resonance frequency while the magnet frame portion 130-2 is excited at the second resonance frequency. When the magnet frame portion 130-2 is excited to the second resonance frequency, the mirror portion 120-1 resonates at the second resonance frequency due to the vibration of the magnet frame portion 130-2, with such structure, when the mirror portion 120-1 is elastically connected to the magnet frame portion 130-2 which supplies the driving force, the resonance property of the mirror portion 120-1 may be improved, and accordingly, the designing of the scanning optics for uniform scanning velocity may become simpler.

Figure 21:
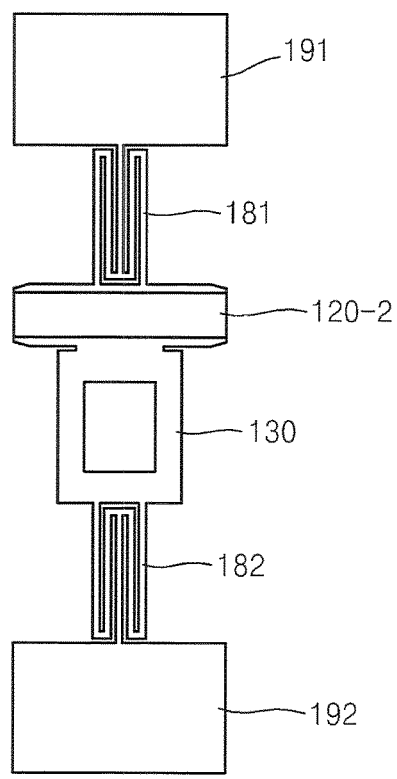
FIG. 21 is a schematic diagram showing the structure of a mirror scanner according to another embodiment.
Figure 22:
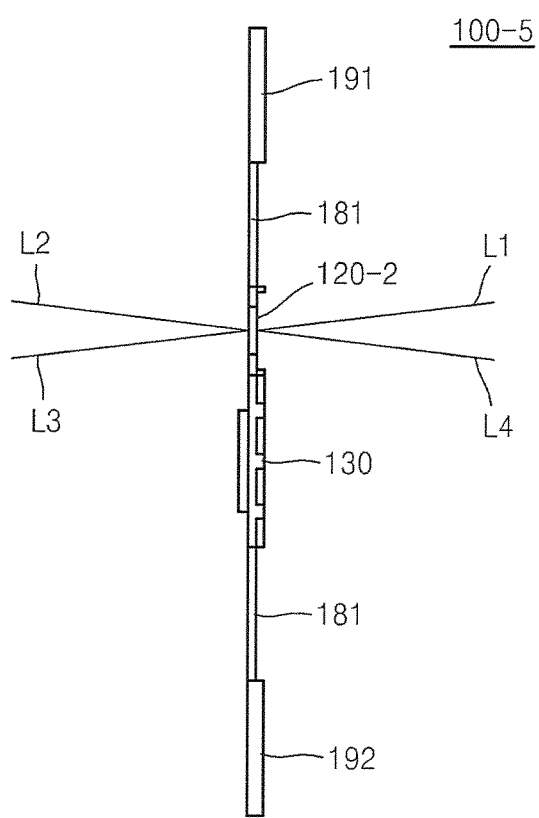
FIG. 22 is a schematic diagram showing light beams being obliquely incident on the mirror scanner of FIG. 21.

FIG. 21 is a schematic diagram showing the structure of a mirror scanner 100-5 according yet other alternative embodiments, and FIG. 22 shows light beams that are obliquely incident on the mirror scanner of FIG. 21.

Referring to FIGS. 21 and 22, the mirror scanner 100-5 may be substantially the same as the mirror scanner shown in FIGS. 1 through 11, except that a mirror portion 120-2 includes only one unit mirror in each face of the mirror portion 120-2.

When the mirror portion 120-2 includes one unit mirror in each face thereof, in order to scan four light beams simultaneously, two light beams L1 and L4, and two light beams L2 and L3 are made to be incident upon the mirror surfaces formed on the respective surfaces of the mirror portion 120-2 at an oblique incident angle as shown in FIG. 22. When the light beams are obliquely incident on the mirror surfaces, a plurality of light beams can be reflected in different light scanning paths from each other even if the mirror surfaces of the mirror portion 120-2 are relatively small.

An optical scanning unit and an image forming apparatus adopting the optical scanning unit according to one or more embodiments will be now described.

Figure 23:
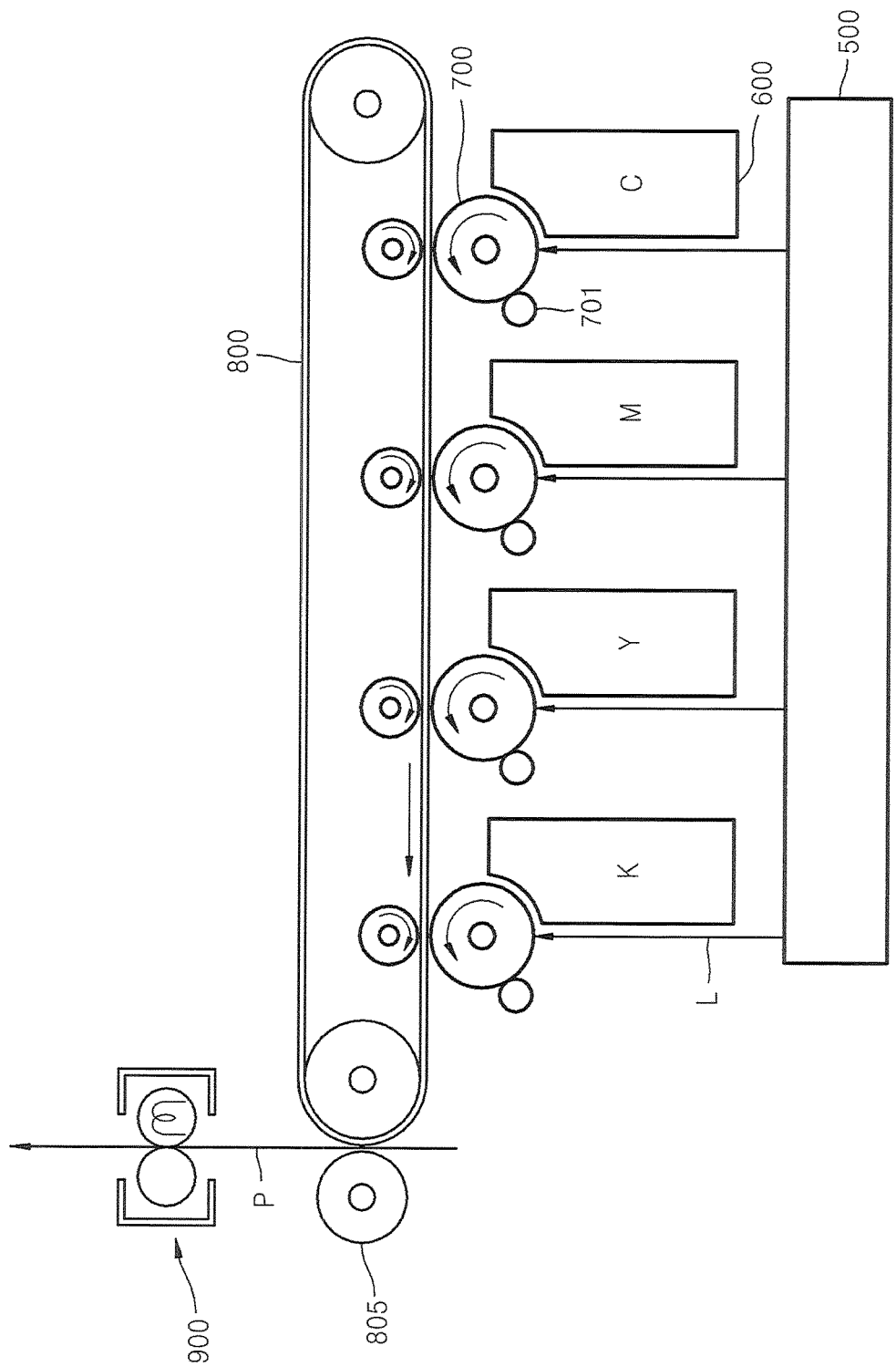
FIG. 23 is a schematic diagram of an image forming apparatus including an optical scanning unit according to one or more embodiments of the present disclosure.

FIG. 23 shows an image forming apparatus including an optical scanning unit 500 according to one or more embodiments described herein.

Referring to FIG. 23, the image forming apparatus may include the optical scanning unit 500, developing units 600, photosensitive drums 700, charging rollers 701, an intermediate transfer belt 800, a transfer roller 805, and a fusing unit 900.

The optical scanning unit 500 scans light beams L that are modulated according to image information onto the photosensitive drum 700. The photosensitive drum 700 is an example of a photosensitive medium, One skilled in the art would however appreciate that a photosensitive belt (not shown) can be another example of the photosensitive medium. The photosensitive drum 700 may, for example, be fabricated by forming a photosensitive layer of a predetermined thickness on an outer circumferential surface of a cylindrical metal pipe. An outer circumferential surface of the photosensitive drum 700 is a scan surface upon which the light beams L from the optical scanning unit 500 are incident. The charging roller 701 charges the outer circumferential surface of the photosensitive drum 700 to a uniform electric potential by applying a charging bias Vc while rotating in association with the outer circumferential surface of the photosensitive drum 700. A corona charger (not shown) may be used instead of the charging roller 701. The developing unit 600 supplies toner to the photosensitive drum 700, e.g., under a developing bias applied between the developing unit 600 and the photosensitive drum 700 to develop the electrostatic latent image into a visible toner image on the photosensitive drum 700. The toner image formed on the photosensitive drum 700 is transferred to the intermediate transfer belt 800. The toner image is transferred from the intermediate transfer belt 800 to a printing medium P that is conveyed between the transfer roller 805 and the intermediate transfer belt 800, for example, by the application of a transferring bias to the transfer roller 805. The toner image transferred onto the printing medium P is fused onto the printing medium P by, for example, heat and/or pressure applied from the fusing unit 900, completing the image forming operation.

In order to print full-color images, the optical scanning unit 500, the developing unit 600, and the photosensitive drum 700 may be provided as units corresponding to several colors. For example, the optical scanning unit 500 scans four light beams respectively on the four photosensitive drums 700 to form electrostatic latent images corresponding to black (K), magenta (M), yellow (Y) and cyan (C) image information on the four photosensitive drums 700. Four developing units 600 provide the photosensitive drums 700 with toners of K, M, Y and C colors to develop the K, M, Y and C electrostatic latent image into the respective toner images. The K, M, Y and C toner images are transferred onto the intermediate transfer belt 800 to overlap with each other, and the overlapped color toner image is in turn transferred to the printing medium P.

Figure 24:
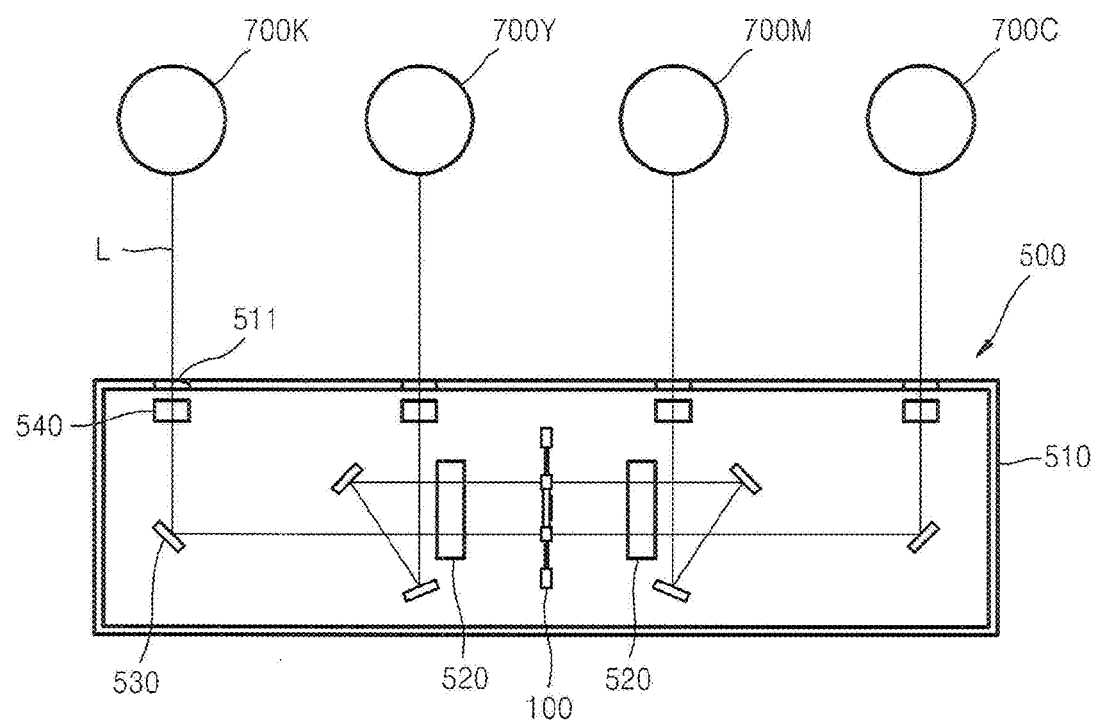
FIG. 24 is a schematic diagram illustrating in greater detail the optical scanning unit included in the image forming apparatus of FIG. 23.

FIG. 24 shows an example of the optical scanning unit 500 adopted in the image forming apparatus of FIG. 23 in greater detail.

Referring to FIG. 24, the optical scanning unit 500 may include light sources 520', a mirror scanner including a MEMS mirror 100, a plurality of optical path converting members 530, and a focusing optics 540, and these optical elements may be received in a housing 510, which includes windows 511.

The mirror scanner included in the optical scanning unit 500 may include the MEMS mirror 100 having four mirror surfaces, e.g., as previously described in reference to FIGS. 1 through 11.

The light source 520 each irradiates two light beams L in parallel onto a mirror surface of the respective face of the MEMS mirror 100. Optical paths of the light beams L are changed by the plurality of optical path converting members 530 to direct the light beams L toward the photosensitive drums 700K, 700Y, 700M and 700C.

The focusing optics 540 are disposed on the optical paths of the light beams L, which proceed toward the photosensitive drums 700K, 700Y, 700M and 700C, and respectively focus the light beams L on the photosensitive drums 700K, 700Y, 700M and 700C. If the MEMS mirror 100 exhibits sinusoidal oscillation, the optical paths may need to be compensated in order that the light beams L that are deflected by the mirror scanner 100 can be scanned onto the photosensitive drums 700K, 700Y, 700M, and 700C at a uniform velocity. Accordingly, the focusing optics 540 may be a sine wave compensation lenses that compensate for the deflected light beams to have arcsinusoidal forms so that the light beams deflected by the mirror scanner 100 can be scanned onto the photosensitive drums 700K, 700Y, 700M, and 700C at a uniform velocity.

Figure 25:
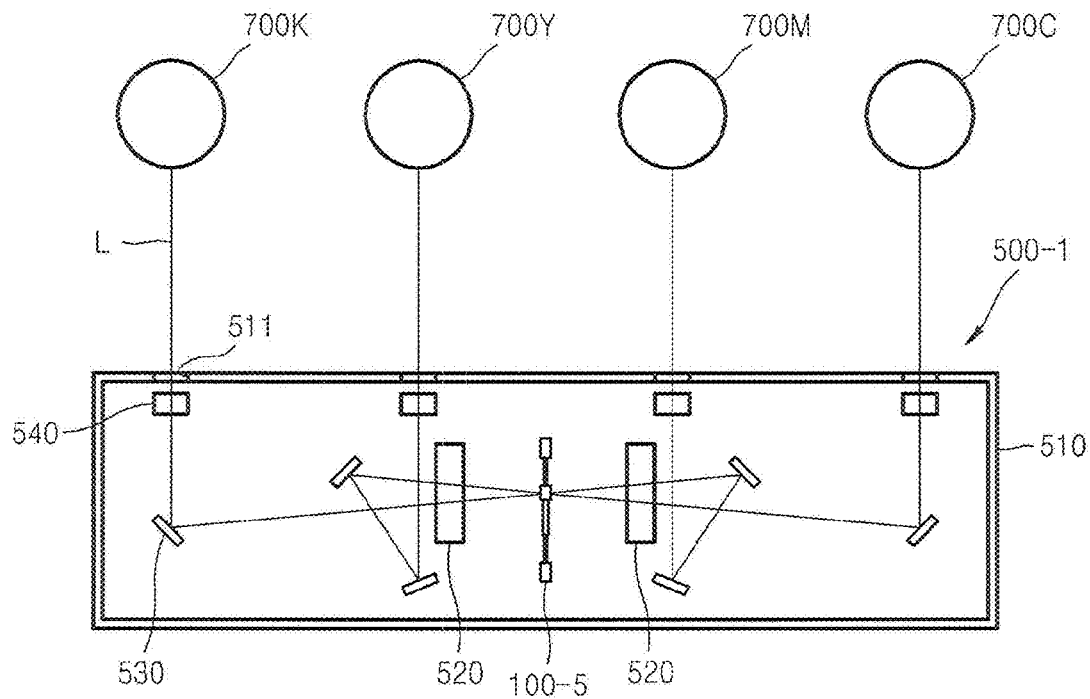
FIG. 25 is a schematic diagram of another example of the optical scanning unit included in the image forming apparatus of FIG. 23.

FIG. 25 shows another embodiment of an optical scanning unit 500-1 that can be adapted in the image forming apparatus of FIG. 23.

Referring to FIG. 25, the optical scanning unit 500-1 may include the light sources 520, a mirror scanner including a MEMS mirror 100-5, the plurality of optical path converting members 530 and the focusing optics 540, supported in the housing 510 that includes the windows 511.

The mirror scanner of the optical scanning unit 500-1 may include the MEMS mirror 100-5 having two mirror surfaces, e.g., one on each face, for example, similar to those previously described in reference to FIGS. 21 and 22.

The light source 520 may each irradiates two light beams L onto a mirror surface on the respective face of the MEMS mirror 100-5 such that the light beams L are incident upon the mirror surface at an oblique angle. Optical paths of the light beams L are changed by the plurality of optical path converting members 530 to direct the light beams L toward the photosensitive drums 700K, 700Y, 700M and 700C. The focusing optics 540 are disposed on the respective optical paths of the light beams L, which proceed toward the photosensitive drums 700K, 700Y, 700M and 700C to focus the respective light beams L on the corresponding one of the photosensitive drums 700K, 700Y, 700M, and 700C. The focusing optics 540 may compensate for the deflected light beams L to have arcsinusoidal forms so that the light beams L can be scanned at a uniform velocity. According to an embodiment, a compensation lens (not shown), which can compensate for distortion that can be caused by the oblique irradiation of the light beams L, may further be disposed between the mirror scanner 100-5 and the focusing optics 540.

According to the embodiments disclosed herein, since the scanning of light beams is performed using an MEMS mirror that is driven by an electromagnetic force, the printing speed can be improved over the conventional deflection method that uses polygon mirrors, and noise can also be reduced. In addition, since the MEMS mirror includes mirror surfaces on both surfaces thereof, a plurality of light beams can be scanned simultaneously even when the mirror surfaces are made relatively small. Therefore, the performance degradation or dynamic deformation when the mirror surfaces increase in size to allow simultaneous scanning of a plurality of light beams attendant conventional art, can be mitigated.

While mirrors, optical scanner and the image forming apparatus of the present disclosure have been particularly shown and described with reference to specific embodiments thereof, it will be understood by those of ordinary skill in the art that various changes in form and details may be made therein without departing from the spirit and scope of the present disclosure as defined by the following claims.

What is claimed is:

1. A micro-electro-mechanical systems (MEMS) mirror, comprising:
a movable unit including a mirror portion and a magnet frame portion, the mirror portion comprising a plurality of unit mirrors, each of which having at least two non-co-planar face surfaces each face surface including thereon one or more mirror surfaces, the magnet frame portion being configured to support therein a magnet:
a first fixing end and a second fixing end spaced apart from each other and from the movable unit; and
a first elastic member and a second elastic member, the first elastic member elastically supporting the movable unit to the first fixing end, the second elastic member elastically supporting the movable unit to the second fixing end,
wherein the magnet frame portion comprises a face surface substantially parallel to at least one face surface of at least one unit mirror, and
wherein at least one unit mirror is disposed at a first end of the face surface of the magnet frame portion and at least one unit mirror is disposed at a second end of the face surface of the magnet frame portion, and
wherein the magnet frame portion includes a grip structure extending into the opening for supporting the magnet in place such that the magnet may be inserted into and removed from the magnet frame portion, and
wherein the magnet frame portion includes a grip structure extending into the opening for supporting the magnet in place such that the magnet may be inserted into the magnet frame portion at an insertion depth at which a rotational axis of the movable unit coincides with rotating center axes of the first and second elastic members.

2. The MEMS mirror of claim 1, wherein the magnet frame portion is located between at least two adjacent ones of the plurality of unit mirrors.

3. The MEMS mirror of claim 1, wherein the mirror portion includes a first unit mirror and a second unit mirror, each of which includes one or more mirror surfaces on each of the at least two face surfaces of the mirror portion.

4. The MEMS mirror of claim 3, wherein the magnet frame portion is located between the first and second unit mirrors.

5. The MEMS mirror of claim 1, wherein the magnet frame portion is located between the mirror portion and one of the first and second elastic members.

6. The MEMS mirror of claim 1, wherein the magnet frame portion includes a first magnet frame located between the mirror portion and the first elastic member, and a second magnet frame located between the mirror portion and the second elastic member.

7. The MEMS mirror of claim 6, further comprising:
a third elastic member located between the mirror portion and the first magnet frame; and
a fourth elastic member located between the mirror portion and the second magnet frame.

8. The MEMS mirror of claim 7, wherein a first resonance frequency of the magnet frame portion and the first and second elastic members is greater than a second resonance frequency of the mirror portion and the third and fourth elastic members.

9. The MEMS mirror of claim 1, further comprising:
a reinforcing rib formed on at least one of the at least two face surfaces of the mirror portion.

10. The MEMS mirror of claim 9, wherein the movable unit is configured to pivot about a rotational axis, the reinforcing rib extending in a direction perpendicular to the rotational axis of the movable unit.

11. The MEMS mirror of claim 9, wherein the reinforcing rib is formed on at least one of the at least two face surfaces at a location adjacent a boundary of at least one of the one or more mirror surfaces.

12. The MEMS mirror of claim 11, wherein the reinforcing rib comprises at least two reinforcing ribs each disposed on respective one of the at least two face surfaces at locations adjacent boundaries of the one or more mirror surfaces, the movable unit being configured to pivot about a rotational axis, the at least two reinforcing ribs each extending in a direction perpendicular to the rotational axis of the movable unit.

13. The MEMS mirror of claim 1, wherein the movable unit, the first and second fixing ends and the first and second elastic members are formed from a double-layered wafer including a first silicon layer and a second silicon layer.

14. The MEMS mirror of claim 13, wherein the double-layered wafer is a silicon-on-insulator (SOI) wafer.

15. The MEMS mirror of claim 13, wherein the mirror portion and the first and second elastic members are formed of the first silicon layer, the magnet frame portion and the first and second fixing ends being formed of the first and second silicon layers.

16. The MEMS mirror of claim 15, further comprising:
a reinforcing rib formed of the second silicon layer on at least one of the at least two face surfaces of the mirror portion.

17. The MEMS mirror of claim 1, wherein the magnet frame portion includes an opening in which to receive the magnet, the movable unit being configured to pivot about a rotational axis, an insertion depth of the magnet being determined such that the rotational axis of the movable unit coincides with rotating center axes of the first and second elastic members.

18. The MEMS mirror of claim 1, wherein the first and second elastic members are formed in zigzag shapes.

19. A mirror scanner, comprising:
a micro-electro-mechanical systems (MEMS) mirror including:
a movable unit including a mirror portion and a magnet frame portion, the mirror portion comprising a plurality of unit mirrors, each of which having at least two non-co-planar face surfaces each face surface including thereon one or more mirror surfaces, the magnet frame portion being coupled to the mirror portion, the magnet frame, portion supporting therein a permanent magnet;
a first fixing end and a second fixing end spaced apart from each other and from the movable unit; and
a first elastic member and a second elastic member, the first elastic member elastically supporting the movable unit to the first fixing end, the second elastic member elastically supporting the movable unit to the second fixing end; and
an electromagnet portion including a yoke and a coil surrounding the yoke, the yoke having end portions spaced apart from, and facing, each other, the end portions being arranged adjacent the permanent magnet to thereby provide an electromagnetic driving force to the MEMS mirror,
wherein the magnet frame portion comprises a face surface substantially parallel to at least one face surface of at least one unit mirror, and wherein at least one unit mirror is disposed at a first end of the face surface of the magnet frame portion and at least one unit mirror is disposed at a second end of the face surface of the magnet frame portion, and wherein the magnet frame portion includes a grip structure extending into the opening for supporting the magnet in place such that the magnet may be inserted into and removed from the magnet frame portion, and wherein the magnet frame portion includes a grip structure extending into the opening for supporting the magnet in place such that the magnet may be inserted into the magnet frame portion at an insertion depth at which a rotational axis of the movable unit coincides with rotating center axes of the first and second elastic members.

20. The mirror scanner of claim 19, wherein a magnetic pole direction of the permanent magnet is perpendicular to the mirror surface, the end portions of the yoke facing one of magnetic poles of the permanent magnet.

21. The mirror scanner of claim 19, wherein the magnetic pole direction of the permanent magnet is parallel to the one or more mirror surfaces and perpendicular to a rotational axis about which the movable unit rotates, the end portions of the yoke facing one of magnetic poles of the permanent magnet.

22. The mirror scanner of claim 19, wherein the mirror portion includes a first unit mirror and a second unit mirror, each of which includes one or more mirror surfaces on both of two face surfaces of the mirror portion.

23. The mirror scanner of claim 22, wherein the magnet frame portion is located between the first and second unit mirrors.

24. The mirror scanner of claim 23, wherein a thickness of the electromagnet portion along a direction parallel to the one or more mirror surface is less than a distance between the first and second unit mirrors.

25. The mirror scanner of claim 23, wherein the electromagnet portion is disposed at a space between a first light beam reflected off the first unit mirror and a second light beam reflected off the second unit mirror.

26. The mirror scanner of claim 19, wherein the magnet frame portion is located between the mirror portion and one of the first and second elastic members.

27. The mirror scanner of claim 26, wherein the electromagnet portion is positioned away from optical paths of light beams that are incident on the mirror portion, the yoke extending from the end portions to the coil at an incline.

28. The mirror scanner of claim 19, wherein the magnet frame portion includes a first magnet frame that is located between the mirror portion and the first elastic member and a second magnet frame that is located between the mirror portion and the second elastic member, the electromagnet portion including a first electromagnet corresponding to the first magnet frame and a second electromagnet corresponding to the second magnet frame.

29. The mirror scanner of claim 28, further comprising: a third elastic member and a fourth elastic member, the third elastic member being located between the mirror portion and the first magnet frame, the fourth elastic member being located between the mirror portion and the second magnet frame.

30. The mirror scanner of claim 29, wherein a first resonance frequency of the magnet frame portion, the first elastic member and the second elastic member is greater than a second resonance frequency of the mirror portion, third elastic member and the fourth elastic member, and wherein the electromagnet portion drives the magnet frame portion at the second resonance frequency.

31. The mirror scanner of claim 19, further comprising: a reinforcing rib formed on at least one of surfaces of the mirror portion.

32. An optical scanning unit, comprising:
a plurality of light sources; and
a mirror scanner configured to receive a plurality of light beams from the plurality of light sources, and to deflect the received plurality of light beams toward one or more surfaces to be scanned, wherein the mirror scanner includes:
a micro-electro-mechanical systems (MEMS) mirror that comprises:
a movable unit including a mirror portion and a magnet frame portion, the mirror portion comprising a plurality of unit mirrors, each of which having at least two non-co-planar face surfaces each face surface including thereon one or more mirror surfaces, a magnet frame portion being coupled to the mirror portion, the magnet frame portion supporting therein a permanent magnet;
a first fixing end and a second fixing end spaced apart from each other and from the movable unit; and
a first elastic member and a second elastic member, the first elastic member elastically supporting the movable unit to the first fixing end, the second elastic member elastically supporting the movable unit to the second fixing end; and
an electromagnet portion including a yoke and a coil surrounding the yoke, the yoke having end portions spaced apart from, and facing, each other, the end portions being arranged adjacent the permanent magnet to thereby provide an electromagnetic driving force to the MEMS mirror,
wherein the magnet frame portion comprises a face surface substantially parallel to at least one face surface of at least one unit mirror, and
wherein at least one unit mirror is disposed at a first end of the face surface of the magnet frame portion and at least one unit mirror is disposed at a second end of the face surface of the magnet frame portion, and
wherein the magnet frame portion includes a grip structure extending into the opening for supporting the magnet in place such that the magnet may be inserted into and removed from the magnet frame portion, and
wherein the magnet frame portion includes a grip structure extending into the opening for supporting the magnet in place such that the magnet may be inserted into the magnet frame portion at an insertion depth at which a rotational axis of the movable unit coincides with rotating center axes of the first and second elastic members.

33. The optical scanning unit of claim 32, farther comprising:
a focusing optics configured to focus the plurality of defected light beams deflected by the mirror scanner onto the one or more surfaces to be scanned.

34. The optical scanning unit of claim 33, wherein the focusing optics comprises a arcsinusoidal compensation lens that applies an arcsinusoidal function to the plurality of deflected light beams so that the light beams deflected by the mirror scanner are scanned at a uniform velocity.

35. The optical scanning unit of claim 32, wherein the mirror portion includes a first unit mirror and a second unit mirror, each of which including a mirror surface on each of two faces of the mirror portion.

36. The optical scanning unit of claim 35, wherein at least two of the plurality of light beams, which are incident upon a first mirror surface corresponding to at least one of the first and second unit mirrors, are parallel to each other.

37. The optical scanning unit of claim 32, wherein at least one of the plurality of light beams incident upon the mirror surface on one of the two faces of the unit mirror has an oblique incident angle.

38. An image forming apparatus, comprising:
a plurality of photosensitive media;
an optical scanning unit including a plurality of light sources and a mirror scanner, the mirror scanner receiving a plurality of light beams from the plurality of light sources, and deflecting each of the received plurality of light beams toward the corresponding respective one of plurality of photosensitive media to thereby form electrostatic latent images on the plurality of photosensitive media: and
a developing unit configured to supply toner to develop the electrostatic latent images formed on the photosensitive media,
wherein the mirror scanner comprises:
a micro-electro-mechanical systems (MEMS) mirror that comprises:
 a movable unit including a mirror portion and a magnet frame portion, the mirror portion comprising a plurality of unit mirrors, each of which having at least two non-co-planar face surfaces each face surface including thereon one or more mirror surfaces, a magnet frame portion being coupled to the mirror portion, the magnet frame portion supporting therein a permanent magnet;
 a first fixing end and a second fixing end spaced apart from each other and from the movable unit; and
 a first elastic member and a second elastic member, the first elastic member elastically supporting the movable unit to the first fixing end, the second elastic member elastically supporting the movable unit to the second fixing end; and an electromagnet portion including a yoke and a coil surrounding the yoke, the yoke having end portions spaced apart from, and facing, each other, the end portions being arranged adjacent the permanent magnet to thereby provide an electromagnetic driving force to the MEMS mirror,
wherein the magnet frame portion comprises a face surface substantially parallel to at least one face surface of at least one unit mirror, and
wherein at least one unit mirror is disposed at a first end of the face surface of the magnet frame portion and at least one unit mirror is disposed at a second end of the face surface of the magnet frame portion, and
wherein the magnet frame portion includes a grip structure extending into the opening for supporting the magnet in place such that the magnet may be inserted into and removed from the magnet frame portion, and
wherein the magnet frame portion includes a grip structure extending into the opening for supporting the magnet in place such that the magnet may be inserted into the magnet frame portion at an insertion depth at which a rotational axis of the movable unit coincides with rotating center axes of the first and second elastic members.

39. The image forming apparatus of claim 38, wherein the mirror portion includes a first unit mirror and a second unit mirror, each of which includes one or more mirror surfaces on each of two face surfaces of the mirror portion, at least two of the plurality of light beams incident upon one of the one or more mirror surfaces being parallel to each other.

40. The image forming apparatus of claim 38, wherein at least one of the plurality of light beams incident upon the mirror surface on one of the two faces of at least one unit mirror having an oblique incident angle.

\* \* \* \* \*